United States Patent [19]
Joto

[11] Patent Number: 5,861,874
[45] Date of Patent: Jan. 19, 1999

[54] COORDINATE INPUT APPARATUS

[75] Inventor: Takuma Joto, Nara, Japan

[73] Assignee: Sharp Kabushiki Kaisha, Osaka, Japan

[21] Appl. No.: 881,150

[22] Filed: Jun. 24, 1997

[30] Foreign Application Priority Data

Jun. 24, 1996 [JP] Japan ................................. 8-163445

[51] Int. Cl.[6] .................................................. G09G 5/00
[52] U.S. Cl. ................... 345/173; 178/18.01; 178/18.02
[58] Field of Search ..................................... 345/173, 174,
345/175, 176, 177, 178, 179, 180, 181,
182, 183, 156, 157; 178/18, 19, 18.01,
18.02, 18.03, 18.1, 19.01

[56] References Cited

U.S. PATENT DOCUMENTS

| | | | |
|---|---|---|---|
| 4,277,783 | 7/1981 | Sampieri et al. | ........................ 345/182 |
| 5,500,937 | 3/1996 | Thompson-Rohrlich | ............... 345/173 |

FOREIGN PATENT DOCUMENTS

| | | |
|---|---|---|
| 0333372 | 9/1989 | European Pat. Off. . |
| 0513792 | 5/1992 | European Pat. Off. . |
| 57-168385 | 10/1982 | Japan . |
| A4-57117 | 2/1992 | Japan . |
| A5-324163 | 12/1993 | Japan . |
| A6-4203 | 1/1994 | Japan . |
| A6-295219 | 10/1994 | Japan . |
| A6-342336 | 12/1994 | Japan . |
| A7-64704 | 3/1995 | Japan . |
| 9309522 | 5/1993 | WIPO . |

*Primary Examiner*—Xiao Wu

[57] ABSTRACT

It is an object of the invention to provide a coordinate input apparatus which can eliminate an input point erroneously inputted. Values of voltage of pairs of electrodes 31, 32; 33, 34 of a tablet 24 are sampled at time t1 by A/D converter circuits 41, 42 to obtain values of X and Y coordinates of a latest input point. A coordinate predicting circuit 43 finds a predicted point of an input point of one period ahead from the coordinates of the latest input point and the input point at time t0 of one period before. The predicted point of the input point at time t1 is found in advance when the input point at time t0 is obtained. An erroneous input discriminating circuit 44 finds an error of the coordinates of the latest input point and the predicted point with respect to X- and Y-axis directions. When the error of the coordinates is less than an allowable error both in X- and Y-axis directions, the input point is determined to be valid and the coordinate of the input point is supplied to a buffer 47 as it is. When the error of the coordinates is the allowable error or more, the input point is determined to be invalid and (0, 0) is supplied to the buffer 47.

8 Claims, 15 Drawing Sheets

COORDINATE INPUT APPARATUS

BACKGROUND OF THE INVENTION

1. Field of the Invention

The present invention relates to a coordinate input apparatus suitably used as an input apparatus of information processors such as a personal computer and a word processor.

2. Description of Related Art

A coordinate input apparatus called a tablet has been used as an input apparatus for inputting hand-writing letters and graphics to electronic equipment such as a personal computer and a word processor. The coordinate input apparatus is also called a touch panel. The coordinate input apparatus has a pointing area which is a two-dimensional plane. When the user presses down the pointing area continuously, similar to drawing a line on a paper with a pen, the coordinate input apparatus outputs values of coordinates which correspond to each of a plurality of points on the line in order of the passed points.

The pointing area of such coordinate input apparatus is constructed often by a translucent member for example. This member is used by laying it on top of a visual display area of a display unit such as a cathode ray tube or liquid crystal display. At this time, the display unit changes pixels which correspond to the coordinate output from the coordinate input apparatus, i.e. the pixels right under the position of the area which has been pressed down by the user, from white display to black display. Thereby, a curve approximated by the input points thus inputted and broken lines connecting the input points is displayed on the display unit.

FIG. 18 is a block diagram showing an electrical structure of a resistor film type coordinate input apparatus. Two resistor films having the same size with a pointing area 3 for example are disposed while leaving a space therebetween in the resistor film type coordinate input apparatus. Two pairs of electrodes 4, 5; 6, 7 are attached to the pair of resistor films in the directions vertical to each other. For example, the electrodes 4, 5 detect the coordinate of a position in the X direction indicated by an arrow 17 in the pointing area 3 and the electrodes 6, 7 detect the coordinate of the position in the Y direction indicated by an arrow 18 in the pointing area 3.

One pair of electrodes attached in one direction of the pointing area are used as scanning electrodes so as to apply a gradient voltage and the other pair of electrodes are used as detection electrodes. When the user presses down one point in the pointing area by a pen or by a finger, the resistor films contact at that point and the voltage between the electrodes in one direction is divided. The values of the voltage thus divided are detected by the electrodes in the other direction. A ratio of division of the gradient voltage obtained from this voltage value is equal to a ratio of a distance between the electrodes divided by the input point. Accordingly, the value of coordinate of the input point in one direction can be obtained from the values of voltage thus divided. The two-dimensional coordinate of the input point within the pointing area can be detected by using the above-mentioned two pairs of electrodes while switching them alternately in a short time. The resistor film type coordinate input apparatus detects the values of the coordinate of the input point by checking variations of the values of voltage among each of those electrodes 4, 5 as well as 6, 7.

The values of voltage detected by the electrodes 4, 5 as well as 6, 7 are supplied to analog/digital converter circuits 9 and 10 (hereinafter abbreviated as "A/D converter circuit" in the figure), respectively. The analog/digital converter circuits 9 and 10 convert analog outputs from the electrodes 4, 5; 6, 7 into digital outputs for sampling per predetermined unit time measured by a timer 11. The outputs from the analog/digital converter circuits 9 and 10 are stored in an X coordinate buffer 14 and a Y coordinate buffer 15 in a buffer 13 as the X coordinate and the Y coordinate of the input point output from the pointing area 3. The above-mentioned electronic equipment reads the X and Y coordinates of the input point from the respective buffer areas 14 and 15 in the buffer 13 to use in the processing thereafter.

In the coordinate input apparatus described above, the input point is inputted by the user who presses down the pointing area by a finger or by holding a pointing member such as a pen, with a similar operation to drawing a line on a paper with a pen. The input point pointed by the user is the point pressed down by the pointing member. At this time, if the hand holding the pointing member erroneously touches the pointing area and presses down the resistor film, sometimes the coordinate of the position which the hand touched is output erroneously as a coordinate of the input point. Further, if a degree of pressure for pressing down the pointing area by the pointing member is less than the pressure necessary for contacting the pair of resistor films, the values of the coordinate which corresponds to the input point may not be output.

Still more, when the coordinate input apparatus described above is used as an input apparatus of an electronic equipment, the peripheral edge portion of the pointing area is often overlapped with a case of the electronic equipment. When a portion of the case which overlaps with the peripheral edge portion of the pointing area is held strongly while using the electronic equipment, the case may be pressed and deformed, thus pressing down the pointing area. Then, the coordinate of the position pressed at this time may be erroneously output as a coordinate of an input point.

The input coordinate inputted through the pointing area is output as an electrical signal for example. Accordingly, there may be case when noise is superimposed to the electrical signal during the time from when it is output from the pointing area 3 till stored in the buffer areas 14 and 15. Thereby, the values of the coordinate of the input point stored in the buffer areas 14 and 15 may deviate from the actual values by the noise.

Thus, the erroneous inputs by which the values of coordinate of the input point inputted from the pointing area 3 are erroneously output occur in the coordinate input apparatus. Then, the applicant of the present invention has proposed a display integrated tablet device which has been disclosed in Japanese Unexamined Patent Publication JP-A 6-295219 as a coordinate input apparatus which can eliminate the erroneous inputs described above. This tablet device enables to input coordinates by utilizing a constitution of a display panel such as a liquid crystal display. The display panel is constituted such that first and second electrode groups in which thin strips of electrodes are arrayed in parallel are disposed so as to face each other so that the longitudinal directions of the electrodes cross at right angles each other while leaving a space therebetween.

When a coordinate is to be inputted, scan voltage is applied alternately to the electrode groups to scan each electrode group sequentially. The user draws or contacts a detection pen near to/with a desirable position on the surface of the display panel. At this time, induced voltage is generated by floating capacity between the detection pen and the electrodes to which the scan voltage has been applied. The tablet device discriminates the input coordinate based on the variation of the induced voltage and timing when the voltage is applied to each electrode. At this time, the tablet device binalizes an output, i.e. the variation of the induced voltage of the detection pen, by a comparator to count a number of pulses. When the number of pulses thus counted is greater than an actual number of times of electrode scan, it is considered that there has been an erroneous input.

There has been disclosed a touch operating input apparatus which can eliminate an erroneous input caused by a structure peculiar to the tablet in Japanese Unexamined Patent Publication JP-A 4-57117. According to the input apparatus of the present publication, an optical touch panel for example is disposed on a display while overlaying a contact type touch panel. The user operates the two kinds of panels in the same time. The input apparatus discriminates that the input is correct only when the same coordinate is inputted on the two kinds of panels, respectively.

For example, the optical touch panel causes an erroneous input when a flying object such as an insect or foreign material infiltrates into the pointing area. The contact type touch panel causes an erroneous input when the structural member of the pointing area has a flaw or deformation. The contact type touch panel will cause no erroneous input even if a flying object infiltrates into the pointing area. Similarly, the optical touch panel will cause no erroneous input even if the structural member of the pointing area gets a flaw. Thus, the cause of the erroneous input of the touch panel is different depending on the structure thereof. Accordingly, even if the cause of the erroneous input described above occurs, no erroneous input will occurs on one touch panel, though an erroneous input occurs on the other touch panel.

Accordingly, it is possible to eliminate the erroneous input based on the cause peculiar to each individual touch panel by determining that the input is correct only when the coordinates which correspond to the same position are inputted respectively from the two overlaid panels. However, because the two kinds of coordinate input apparatuses are used in the touch operating input device described above, the structure is complicated. Accordingly, the size of the device becomes large, increasing the manufacturing cost thereof.

Further, a coordinate reader which calculates a position indicated by a coordinate indicator within a tablet and which allows an erroneous input to be eliminated has been disclosed in Japanese Unexamined Patent Publication JP-A 6-4203. This coordinate reader detects the coordinate based on induced current which is generated within the tablet by electrical coupling which is generated between the tablet and the coordinate indicator when they are drawn closer or are contacted. At this time, among variations of voltage caused within the tablet, variation caused by external noise is instantaneous and variation in inputting the coordinate continues for a certain period of time. Accordingly, when the variation of voltage occurs, the duration is counted by a timer to determine that the input coordinate is correct only when the variation of voltage continues more than a predetermined time set in advance. However, it is difficult to determine whether the coordinate is correct or not before a time more than the predetermined time passes since when the coordinate has been inputted.

A coordinate input apparatus which detects an input coordinate by using a capacitive coupling method for an X-Y matrix display and which allows the erroneous inputs to be eliminated has been disclosed in Japanese Unexamined Patent Publication JP-A 7-64704. When an input pen is abutted with the display in the coordinate input apparatus, a capacitive coupling occurs between the pen and the display. Thereby, scan voltage which has been applied to a display electrode of the display is also applied to an electrical circuit of the pen, thus causing a change in the output of the pen. The input coordinate is detected by specifying the display electrode which has been scanned when the change in the voltage has occurred.

A switch which turns off only when the pen is abutted with the display is provided at the edge of the pen. When the edge of the pen is not abutted on the display and the switch is on, impedance of the pen is dropped. Thereby, noise which mixes in when the pen is not abutting with the display is reduced. This method of eliminating the noise of the coordinate input apparatus is effective only for the coordinate input apparatus constructed as described above.

A coordinate detector and a coordinate detecting method which allow the influence of noise to be eliminated are disclosed in Japanese Unexamined Patent Publication JP-A 5-324163. A coordinate is inputted by pressing a resistor film sheet, i.e. an pointing area, by pen input means in this coordinate detector. When the resistor film sheet is pressed by the pen input means, values of coordinate at that time are sampled by a plurality of times to average the values of the sampling data. This average value is compared with each sampling data, the sampling data which deviates from the average value more than a predetermined deviation is excluded and only values of the remaining sampling data are averaged again. An average value of the remaining data is considered as the value of coordinate which has been inputted. The noise eliminated by this method is what is added on a power line of a power source which the tablet applies at the both ends of the resistor film sheet. Accordingly, it is different from what eliminates the erroneous input of the tablet.

Further, an information processor which reduces errors of specification of coordinate or area is disclosed in Japanese Unexamined Patent Publication JP-A 6-342336. Input means of this information processor is what inputs coordinates by pressing down by pointing means such as a finger or a pen. At this time, the pointing means validates the input coordinate only when pressure for pressing down the input means exceeds a predetermined value.

The input means of the information processor described above determines whether the coordinate inputted at this time is correct or not in correspondence to the pressure when the pointing means presses down the input means. Accordingly, if the pressure exceeds the predetermined value, it is difficult to eliminate the input coordinate even if it is actually erroneous. For example, when a line is to be drawn on the input means by the pointing means, an input coordinate is considered to be valid if the pressure in inputting it exceeds the predetermined value even if the input is made at the position separated from the position which is assumed from the direction and speed of the advancement of the pointing means.

SUMMARY OF THE INVENTION

Accordingly, it is an object of the present invention to provide a coordinate input apparatus capable of eliminating an erroneous input which occurs at a position separated from a position predicted from an input operation in inputting coordinates continuously like an operation of drawing a line.

The present invention provides a coordinate input apparatus comprising:

two-dimensional coordinate input means having a flat pointing area, for outputting a two-dimensional coordinate corresponding to a point within the pointing area which is continuously pointed, per predetermined period;

coordinate predicting means for defining a predicted coordinate area showing a range of a coordinate predicted to be outputted from the two-dimensional coordinate input means in correspondence to the coordinate outputted from the two-dimensional coordinate input means, in accordance to a predetermined procedure per predetermined period;

erroneous input discriminating means for determining that the coordinate outputted from the two-dimensional coordinate input means is valid only when the coordinate is contained within the predicted coordinate area defined in correspondence to the coordinate; and coordinate defining means for defining the coordinate outputted from the two-dimensional coordinate input means as it is when the coordinate is determined to be valid by erroneous input discriminating means and for rejecting the coordinate when it is determined to be invalid; wherein the coordinate predicting means corresponds to the output of the coordinate defining means and defines the predicted coordinate area by using a plurality of coordinates defined by the coordinate defining means.

According to the invention, the coordinate input apparatus allows coordinates of arbitrary points on a plane to be inputted continuously in a short time. The coordinate input apparatus is a so-called tablet device and is used as an input device of electronic equipment such as an electronic pocketbook and a computer.

The coordinate input means includes the two-dimensional coordinate input means arranged so as to overlay a visual display area of a display unit for example. The two-dimensional coordinate input means has a flat pointing area having a predetermined size. The user points an input point by pressing down and applying pressure to one point on the pointing area, for example. When the pointing area is continuously pressed down with a sense of drawing a curve on paper, the two-dimensional coordinate input means detects and samples coordinates of positions within the area which are pressed down per predetermined period. Thereby, the plurality of points on the curve may be recognized respectively as input points. Thus, the plurality of points on the curve may be inputted continuously as input points on the two-dimensional coordinate input means. The coordinates of the input points are outputted per predetermined period.

The coordinate predicting means defines the predicted coordinate area which represents a range of coordinates predicted to be outputted from the two-dimensional coordinate input means as the coordinate of the input point. The predicted coordinate area is defined by using the plurality of coordinates defined by the coordinate defining means. Those coordinates are coordinates of output points defined by the coordinate defining means before the predicted coordinate is outputted. For instance, when the user continuously inputs input points so as to draw a curve on the pointing area, the predicted coordinate area of the coordinate of the latest input point is defined based on the defined coordinates of a plurality of output points on the same curve.

The erroneous input discriminating means determines whether the input point is an erroneous input or not based on the predicted coordinate area defined by the coordinate predicting means. When the coordinate of the input point is contained in the predicted coordinate area which corresponds to the input point, the coordinate of the input point is determined to be valid. At this time, the input point is on the same curve with a curve containing a past input point for which the discrimination of erroneous input has been made in the past going back from the output of the input point for example. When the coordinate of the input point is not contained within the predicted coordinate area, the coordinate is invalid and the input point is determined to be an erroneous input. At this time, the input point is located at a position where it is difficult to input continuously from the aspect of the past output point.

The coordinate defining means defines the coordinate of the output point based on the discrimination result of the erroneous input discriminating means. That is, when the coordinate is determined to be valid, the coordinate of the input point is defined as it is and is outputted as the coordinate of the output point. When it is invalid and is determined to be an erroneous input, the coordinate of the input point is rejected. At this time, (0, 0), i.e. the reference point, is outputted for example as the coordinate of the output point. The coordinates of these output points are supplied to the electronic equipment as the coordinates of points inputted by the user.

Thereby, an input point which is located at a position separated so far that it becomes difficult to use to draw a curve is determined to be an erroneous input in inputting a handwriting letter or a curve. Therefore, it is possible to determine a coordinate as an erroneous input even if the coordinate of a position which a thing other than a pointing member such as a finger or a pen has touched is erroneously outputted in inputting input points continuously by drawing a line on the pointing area with the sense of drawing a line on a paper. Further, this discrimination of erroneous input may be used in any apparatus, beside the arrangement of the tablet.

Further, the coordinate input apparatus will not output the coordinate of an input point determined to be an erroneous input. For instance, although the electronic equipment described above switches a display color of pixels within the visual display area of the display unit which correspond to the coordinate to another color when it obtains the coordinate from the coordinate input apparatus, the input point of the erroneous input is not displayed in the electronic equipment if no coordinate of the input point is given. Therefore, only the curve inputted by the user can be drawn on the visual display area of the display unit. When a curve is thus inputted by using the tablet which is the two-dimensional coordinate input means for example, only an input point which is within the predicted coordinate area provided ahead of an imaginary line extended from this curve is used in the processing thereafter. Thereby, it becomes possible to eliminate the coordinate at the position which the thing other than the pointing member for inputting the input point has touched from the processing thereafter.

Further, the invention is characterized in that the coordinate predicting means includes;

displacement computing means for determining a displacement in coordinate to a past coordinate defined in a latest past from a latest coordinate defined by the coordinate defining means and a displacement direction; and predicted coordinate computing means for determining a predicted coordinate which is displaced from the latest coordinate defined by the coordinate defining means by the displacement determined by the displacement computing means in the displacement direction;

wherein an area having the predetermined size containing the predicted coordinate is set as the predicted coordinate area.

According to the present invention, the coordinate predicting means predicts a coordinate of a future input point from the coordinates of the past output point and the latest output point. The predicted coordinate area is an area containing the predicted coordinate. The future input point is an input point sampled at the point of time advanced by one sampling period from the time when the latest coordinate is sampled.

The coordinates of the past output point and the latest output point are stored in the coordinate predicting means. The coordinate of the past output point is the coordinate which is sampled and outputted in a sampling which precedes by more than one sampling period from the sampling of the latest coordinate. This past coordinate is the latest one among the coordinates defined before the sampling of the latest output point.

The displacement computing means determines the displacement and the direction of displacement from the past coordinate to the latest coordinate. That is, it determines the size and orientation of a vector which originates the past output point represented by the past coordinate and ends the latest output point represented by the latest coordinate. The orientation of this vector points the tangential direction of the past output point in a curve approximated by broken lines by sequentially connecting a plurality of output points outputted continuously. These output points assume the same coordinates as the input points if the input points are not erroneous inputs.

The predicted coordinate computing means determines a coordinate which has been displaced by the displacement in the displacement direction from the latest coordinate as a predicted coordinate of the future input point. The future predicted point represented by the predicted coordinate is the end point of a vector which originates from the latest output point and has the same size and orientation as those of a vector having the latest output point and the past output point as both ends. Accordingly, the past output point, the latest output point and the future predicted point exist on the same straight line.

In the coordinate input apparatus which is a tablet input apparatus for example, the period for sampling the value of coordinate of the two-dimensional coordinate input means is very short as compared to speed at which the user draws a curve on the pointing area. Accordingly, even if the curve having the both ends of the output points of the past and latest coordinates is approximated by a line segment having both ends of the both output points, the error is very small. Further, the speed at which the user draws the curve is very slow as compared to the sampling period. Accordingly, even if the change of curvature of the curve to be drawn is very large, the move of the finger or the pen is considered to change barely after one sampling period. Therefore, a curve of finite length which passes through three consecutive input points sequentially and which has both ends of the input points may be approximated by a line segment which passes through those three points provided that all the points are valid. Accordingly, the future coordinate is considered to exist near a straight line which passes through two output points represented by the past and latest coordinates in the direction along the direction of the vector from the aspect of the latest coordinate.

Therefore, the coordinate predicting means sets the predetermined area containing the predicted coordinate as the predicted coordinate area. The size of the area is determined based on the magnitude of one sampling period of the speed for drawing the curve. For instance, the shorter the sampling interval, the smaller the size of the area becomes. The erroneous input discriminating means discriminates whether a coordinate actually input is contained within the predicted coordinate area.

Thus, the position of the predicted coordinate area is determined based on the past coordinates determined to be valid in the past. Further, the positional relationship between the latest coordinate and the predicted coordinate area is considered to correspond to the past coordinate and the latest coordinate. Therefore, the position of the predicted coordinate area may be readily defined without implementing complicated computation.

The present invention is also characterized in that two coordinate axes which cross each other are set in the pointing area, that coordinates are represented by values of a corresponding point on the respective coordinate axes and that the predicted coordinate area, each side of which the predicted coordinate area is parallel with either of the coordinate axes and has a predetermined length, is an area centered on the predicted coordinate.

According to the present invention, the predicted coordinate area is a quadrilateral area which is centered on the predicted coordinate and each side is parallel with the axis of coordinate described above. When a curve is to be drawn for example, the latest input point approaches to the past output point from the aspect of the predicted point which corresponds to the latest input point. Because the predicted coordinate area extends also in the direction opposite from the orientation of the vector described above rather than the predicted point, the input point may be determined to be valid also in this case.

Further, when the above-mentioned coordinate system is an orthogonal coordinate system composed of the axes of X and Y coordinates, the coordinate is represented by the X and Y coordinates. At this time, a predicted range in the X coordinate and a predicted range in the Y coordinate of the input point are found individually as independent ranges from the predicted coordinate area. These predicted ranges are ranges of predetermined length centering on the X coordinate and Y coordinate of the predicted coordinate, respectively. The erroneous input discriminating means can determine whether the input point is contained within the predicted coordinate area just by determining whether the values of the X coordinate and Y coordinate of the input point are values more than the lower limit value and less than the upper limit value of the predicted range or not. Accordingly, the use of the predicted coordinate area having such a shape allows the computing operation of the discrimination of erroneous input to be simplified. Therefore, even if the processing circuit used in the present electronic equipment is caused to perform this erroneous input discriminating operation, the burden on the circuit is small. Accordingly, it may be implemented readily.

The present invention is also characterized in that the predicted coordinate area is a circular area which is centered on the predicted coordinate, having a radius of a predetermined length.

According to the invention, the predicted coordinate area is a circular area which is centered on the predicted coordinate and whose radius has a predetermined length. Accordingly, the erroneous input discriminating means can determine whether the input point is contained within the predicted coordinate area just by comparing the value of distance between the predicted point and the point actually input with the value of radius of the circular area. Accordingly, the computing operation of the discrimination of erroneous input may be simplified. Therefore, even if the processing circuit used in the present electronic equipment is caused to perform this erroneous input discriminating operation, the burden on the circuit is small. Accordingly, it may be implemented readily.

The present invention is also characterized in that the predicted coordinate area is a sector area having a radius of a predetermined length and a central angle of a predetermined degree and that a line segment having both ends of the defined latest coordinate and the predicted coordinate passes through the center of an imaginary circle containing an arc of the sector area.

According to the present invention, the predicted coordinate area is a sector area containing the predicted coordinate. The position of the future input point changes from the position very close to the latest input point to the position distant from the latest input point, exceeding the predicted point, depending on a curve drawn at this time. When a curve is to be drawn, the closer the future input point to be inputted is to the latest input point, the closer the straight line which passes through the latest input point and the past input point becomes, and the farther it is, it is considered to be inclined to separate in the direction vertical to the straight line from the aspect of the straight line. Therefore, the input point which may be inputted in the future is considered to distribute so as to form a sector having the center point on the line segment having both ends of the predicted coordinate and the latest input point.

By adopting such sector area as the predicted coordinate area, many points which may be inputted may be contained in the area. Therefore, even if a valid coordinate is coordinate of either a point very close to the latest input point or a point considerably distant, the erroneous input discriminating means can determine that coordinate as the valid coordinate without mistake in the discrimination of erroneous input. Accordingly, the error of the discrimination of erroneous input may be reduced by using the sector area as the predicted coordinate area.

The present invention is also characterized in that the erroneous input discriminating means comprises;

error detecting means for determining an error which is a distance between a point represented by the coordinate output from the two-dimensional coordinate input means and a point represented by the predicted coordinate determined by the predicted coordinate computing means corresponding to the coordinate; and discriminating means for determining that the latest coordinate is valid when the error determined by the error detecting means is less than a predetermined distance between the end of the predicted coordinate area and a point represented by the predicted coordinate in the direction heading to a point represented by the coordinate outputted from the point represented by the predicted coordinate and for determining that the latest coordinate is invalid when the error is the predetermined distance or more.

According to the present invention, the erroneous input discriminating means determines whether the input point is an erroneous input or not based on the difference between the predicted coordinate of the predicted point and the coordinate of the input point which corresponds to the predicted point.

When the coordinate of the latest input point is sampled and outputted and when the predicted coordinate is defined, the error detecting means finds the distance between the input point and the predicted point as an error between the latest coordinate and its predicted coordinate. The predicted coordinate which corresponds to the latest coordinate is found in advance going back to the past from the latest sampling for example.

The discriminating means determines whether the error found by the error detecting means is less than the above-mentioned predetermined distance. That is, it is determined whether the line segment having the both ends of the predicted point and the input point stays within the predicted coordinate area. The discriminating means determines that the latest coordinate is valid only when the error is less than the predetermined distance.

The computing operation for the discrimination may be simplified by discriminating whether the coordinate of the input point is valid or not based on the error between the predicted point and the input point as described above. Therefore, because the burden of the discriminating operation may be reduced, the burden on the circuit is small even if the processing circuit provided in the present electronic equipment is caused to perform this discriminating operation. Accordingly, it may be implemented readily.

The present invention is also characterized in that the two-dimensional coordinate input means outputs a status signal indicative of that the coordinate has been outputted every time of outputting two-dimensional coordinate, that the coordinate input apparatus further comprises a delay circuit for delaying the status signal by a predetermined delay time necessary for outputting coordinates of a predetermined number of points used in defining the predicted coordinate area from the two-dimensional coordinate input means and for outputting the status signal to the coordinate defining means and that the coordinate defining means defines the coordinate only when the status signal is supplied.

According to the present invention, the two-dimensional coordinate input means outputs the status signal every time of outputting two-dimensional coordinate. This status signal indicates that the two-dimensional coordinate has been normally sampled by the input means. The status signal is supplied to the coordinate defining means after being delayed by the predetermined time by the delay circuit. Accordingly, a status signal at the time of sampling going back by the predetermined delay time from the sampling when the latest coordinate is obtained is supplied to the coordinate defining means. The coordinate defining means defines the coordinate only when the status signal is supplied and reject it when no status signal is supplied. Accordingly, when a line is to be inputted, all the coordinates are rejected from the input point which corresponds to the beginning of drawing until when a predetermined number of defined input points are inputted.

As described above, the coordinate predicting means defines the predicted coordinate area by using a plurality of defined coordinates which are the past coordinates older than the latest coordinate to be discriminated. Accordingly, it cannot define the predicted coordinate area until when a required number of coordinates are defined and obtained from the beginning of the inputted of the coordinate in inputting a curve for example. According to the coordinate input apparatus of the invention, the definition of the coordinate is stopped until when the predicted coordinate area is obtained. Thereby, because the coordinate is not outputted until when the predicted coordinate is obtained and the coordinate predicting operation is allowed, only coordinates which are assured to be correct may be defined and outputted.

The present invention is also characterized in that the erroneous input discriminating means determines whether the coordinate is valid or not only when the status signal outputted from the delay circuit is supplied, that the delay circuit is constructed so that the output from the erroneous input discriminating means is supplied thereto, that the same number of memory elements with the predetermined number are connected sequentially so that the outputs thereof are transferred to the next memory elements and the outputs of the previous memory elements are supplied per predetermined period and that each memory element stores each status signal individually and erases its memory content when the coordinate is determined to be invalid by the erroneous input discriminating means.

According to the present invention, the two-dimensional coordinate input means outputs the status signal indicative of that the coordinate has been outputted every time of outputting two-dimensional coordinate. This status signal is supplied to the erroneous input discriminating means and the coordinate defining means after being delayed by the predetermined delay time by the delay circuit. The erroneous input discriminating means performs the erroneous input discriminating operation only when the status signal is supplied in addition to the input point and the predicted coordinate area.

The delay circuit is constructed so that the memory elements which are registers for example are connected sequentially so that the output thereof is supplied to the next memory elements and so that the output of the previous memory elements are supplied. The status signal output during the sampling is stored individually to each memory element. Therefore, when the sampling operation is started, the status signal stored in each memory element is transferred to the later memory element sequentially stage by stage and the status signal outputted from the last memory element is supplied to the erroneous input discriminating means and the coordinate defining means.

The same number of memory elements with the number of points used for defining the predicted coordinate area are prepared. Therefore, the status signal inputted to the delay circuit is transferred to each stage per each sampling operation performed periodically. Accordingly, the status signal inputted to the delay circuit is outputted after being delayed by a length of time obtained by multiplying the period of the sampling operation with the number of memory elements. Accordingly, the circuit structure of the delay circuit may be readily made.

When the coordinate is determined to be invalid by the erroneous input discriminating means, each memory element erases its memory content to be initialized. The state in which each memory element is initialized is the same with the state in which no input point is inputted from the two-dimensional coordinate input means. Accordingly, when a new coordinate is inputted following to a coordinate determined to be invalid, the delay circuit inputs the status signal outputted from the two-dimensional coordinate input means when the new coordinate is inputted to the first memory element and transfers it sequentially to the last memory element.

In the coordinate input apparatus, the discriminating operation of erroneous input is performed by determining the predicted coordinate area by using a plurality of defined coordinates older than the latest coordinate to be discriminated as described above. When an erroneous input occurs, there is a case when the erroneous input discriminating operation cannot be performed because the predicted coordinate area cannot be found. At this time, because each memory element of the delay circuit is initialized, no status signal is stored in the delay circuit similarly to the point of time when the coordinate of a line is started to be inputted. The defining step in the coordinate defining means may be stopped until when enough defined coordinates which allow the predicted coordinate area to be obtained again can be obtained from when the erroneous input has occurred.

Further, when the erroneous input occurs once as described above, the future predicted coordinate area cannot be obtained correctly. At this time, an error occurs in the discriminating operation and there is a case when an input is determined to be an erroneous input and the delay circuit is reset even though the input is correct. In the coordinate input apparatus of the invention, the erroneous input discriminating means is also caused to perform the discriminating operation only when the status signal is supplied from the delay circuit. Thereby, when enough defined coordinates which allow the predicted coordinate area to be found are obtained, the status signal is outputted always from the delay circuit. Accordingly, the erroneous input discriminating operation may be performed only when the predicted coordinate area is assured by performing the processing operation only when the status signal is obtained.

BRIEF DESCRIPTION OF DRAWINGS

Other and further objects, features, and advantages of the invention will be more explicit from the following detailed description taken with reference to the drawings wherein.

DESCRIPTION OF PREFERRED EMBODIMENTS

Figure 1:
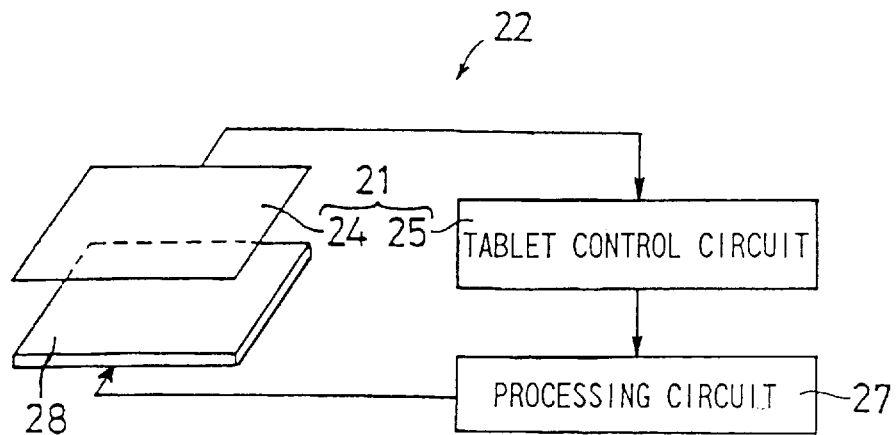
FIG. 1 is a block diagram showing a structure of an electronic equipment 22 comprising a coordinate input apparatus 21 of a first embodiment of the present invention.

Now referring to the drawings, preferred embodiments of the invention are described below.

FIG. 1 is a block diagram showing a structure of an electronic equipment 22 comprising a coordinate input apparatus 21 which is a first embodiment of the present invention. The electronic equipment 22 is realized by a personal computer or a word processor for example.

The coordinate input apparatus 21 comprises a tablet 24 and a tablet control circuit 25. The tablet 24 is called also as a touch panel. The electronic equipment 22 comprises a processing circuit 27 and a display unit 28, beside the coordinate input apparatus 21.

The coordinate input apparatus 21 detects an input point inputted from the tablet 24 and outputs its two-dimensional coordinate. The user of the electronic equipment 22 contacts a pointing member which is a finger or a pen with the tablet 24 to press it down. The pressed point is inputted as the input point. The tablet 24 is placed right above a visual display area which is a flat two-dimensional plane of the display unit 28. The tablet 24 is a translucent flat and plane member. Accordingly, contents displayed on the visual display area of the display unit 28 may be seen through the tablet 24.

The tablet 24 is realized by a resistor film type tablet, for example. Beside the tablet of such a type, there are ones of electrostatic capacity type, optical type and ultrasonic type, depending on the structure thereof. Any type of tablet may be used for the tablet 24 of the present embodiment. The structure of the resistor film type tablet for example will be explained below.

The resistor film type tablet has two transparent electrode members each of which is obtained by forming a translucent conductive film on one surface of a transparent member. The transparent member is formed of a translucent and flexible plastic or resin. In the tablet 24, such pair of transparent electrode members is disposed so that one surface on which the transparent conductive film is formed face each other while leaving a space therebetween. A dot spacer which is made of insulating fine particle is disposed on one surface of either one of the transparent electrode members to interpose between the transparent electrode members. The dot spacer keeps the space between the two transparent electrode members and prevents the transparent conductive films which face each other from contacting when no input point is inputted.

When the other surface of either one of the transparent electrode members of the tablet is pressed down, the transparent conductive films of the two transparent electrode members contact and are shorted. The resistor film type tablet detects the two-dimensional coordinate which corresponds to the pressed point by utilizing this short.

Among the electrostatic capacity type tablets, there is an analog electrostatic capacity type tablet. This tablet is constructed by forming a glass panel by forming a transparent conductive film having a uniform resistivity on one surface of a transparent member and by connecting an element which applies the same voltage to the whole surface of the glass panel at the edge of the panel. When a conductor such as a finger of a user touches with the transparent conductive film of the glass panel, the transparent conductive film is grounded via the conductor and the user having the conductor. Thereby, a small amount of current flows through the transparent conductive film. The small amount of current is detected by two pairs of detecting means provided at the peripheral edges of the glass panel vertically to each other to obtain the coordinate of position of the input point from the values of the current.

The tablet 24 outputs an analog output which corresponds to the coordinate of position of the input point. The analog outputted from the tablet 24 is supplied to the tablet control circuit 25. The tablet control circuit 25 converts the output from the tablet 24 into digital values and implements the discrimination of erroneous input to discriminate whether the input coordinate value is correct or not as described later. The output from the tablet control circuit 25 is supplied to the processing circuit 27 which implements processing based on the coordinate values thus supplied. For example, it inverts pixels within the visual display area which correspond to the coordinate values, i.e. pixels in the visual display area right below the point of the tablet 24 thus operated, from white display to black display to display on the display unit 28.

Figure 2:
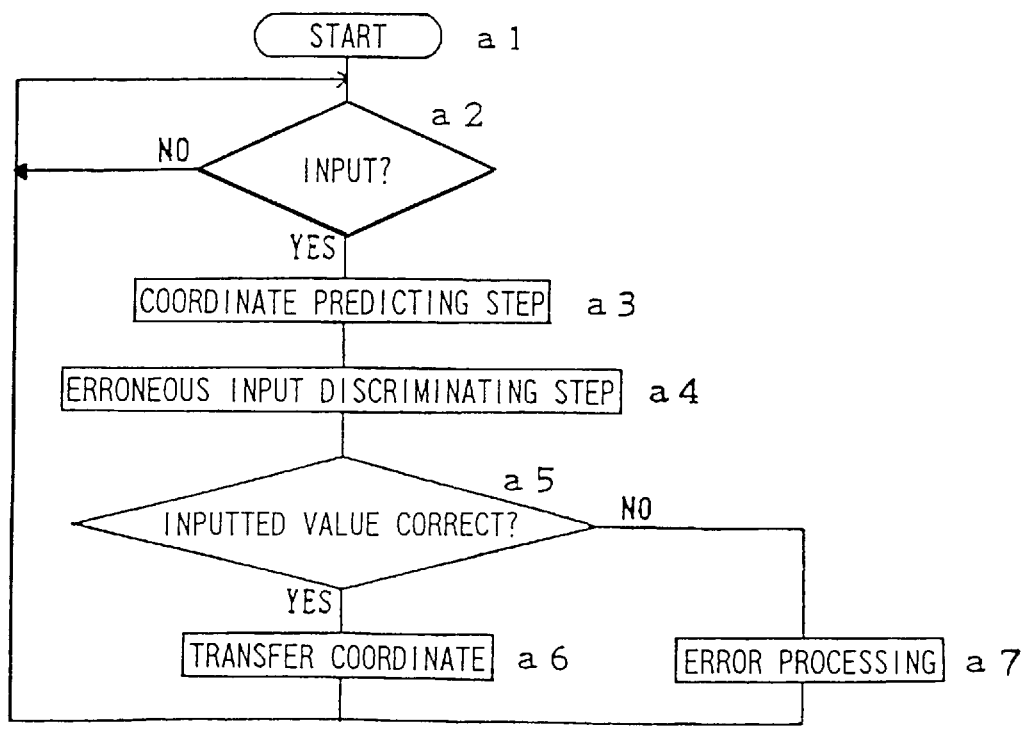
FIG. 2 is a flowchart for explaining an input discriminating operation performed in a tablet control circuit 25.

FIG. 2 is a flowchart for explaining an input discriminating operation performed in the tablet control circuit 25. The user presses down the tablet 24 by using a pointing member such as a pen or a finger in the same manner of drawing a curve on a paper by a writing tool to input an input point. When input points are inputted continuously, the tablet control circuit 25 of the present embodiment implements the discrimination of erroneous input on the latest input point to be inputted anew by using an input point which has been discriminated to be valid among input points inputted in the past.

When the electronic equipment 22 is turned on for example, the process advances from Step a1 to Step a2. At Step a2, it is determined whether the input point has been inputted to the tablet 24. That is, it is determined whether a predetermined change has occurred in the analog output from the tablet 24. For example, the level of the analog output when no input point is inputted is smaller than the level of the analog output when an input point is inputted.

This determination is made during a sampling operation of the analog output performed per predetermined period T for example. When there is no input, the process returns to Step a2 and this determination is repeated until when an input is made. When there is an input, the process advances from Step a2 to Step a3.

At Step a3, a coordinate predicting operation is carried out based on the coordinate of the latest input point inputted during the present sampling operation. In the coordinate predicting operation, a predicted coordinate which is assumed to be inputted during the future sampling operation at the time advanced by the same time with the period T from the sampling operation when the latest input point has been inputted is found. The coordinate predicting operation will be detailed later. After finishing the coordinate predicting operation, the process advances from Step a3 to Step a4. At Step a4, an erroneous input discriminating operation is performed. In the erroneous input discriminating operation, it is determined whether the latest input point is an erroneous input or not based on the predicted coordinate predicted during the latest sampling operation going back to the same time with the period T from the present sampling operation. The discrimination result of the erroneous input discriminating operation is outputted as an error status signal. The erroneous input discriminating operation will be detailed later.

After finishing the erroneous input discriminating operation at Step a4, the process advances to Step a5. At Step a5, it is determined whether the coordinate of the latest input point is valid or not based on the discrimination result of the erroneous input discriminating operation. When it is valid, the process advances from Step a5 to Step a6. At Step a6, the coordinate of the latest input point is transferred to the processing circuit 27 as it is, in addition of the error status signal. The processing circuit 27 operates based on the coordinate and the signal. The error status signal at this time indicates that the latest input point is not erroneous. The coordinate determined to be valid will be referred to as "valid coordinate" hereinafter.

When the coordinate of the latest input point is determined to be invalid and the input is an erroneous input, the process advances from Step a5 to Step a7. At Step a7, an error processing is performed. In the error processing, the coordinate of the latest input point is changed to a predetermined coordinate (0, 0) for example to transfer to the processing circuit 27. Hereinafter, the coordinate which is determined to be invalid will be referred to as "invalid coordinate". In the same time, an error status signal indicative of that the coordinate has been erroneous inputted is transferred to the processing circuit 27. Further, a register is reset to return the tablet control circuit 25 to the initial state as described later. The processing circuit 27 operates based on the coordinate and the signal thus transferred. After finishing the transfer step pertaining to the coordinate of the latest input point at Steps a6 and a7, the process returns to Step a2 to perform the input determining operation on the next latest input point to be inputted after the period T.

Thereby, the coordinate and the error status signal concerning to the latest input point inputted from the tablet 24 are inputted to the processing circuit 27 per the period T for example. The processing circuit 27 causes the display unit 28 to visually display the coordinate of the input point when the error status signal indicates that the input point is not an erroneous input and that the coordinate is valid. Assume that the display unit 28 is a display unit which displays in black and white. At this time, the coordinate of the latest input point is displayed by inverting the display color from the original display color of pixels at position corresponding to the coordinate on the visual display area of the display unit 28. When the input points are inputted continuously for example, the processing circuit 27 causes the display unit 28 to display on the visual display area by inverting the display color of all pixels positioned on a line segment having, as both ends thereof, the latest input point and the input point at the latest sampling is past whose coordinates are valid. Thereby, when a plurality of input points are inputted continuously, a curve approximated by broken lines in which those input points are connected in series is drawn on the display unit 28.

When the error status signal indicates that the input point is an erroneous input and that the coordinate is invalid, the processing circuit 27 stops displaying the given coordinate. When the input points are inputted continuously and when a valid coordinate is transferred again after transferring an invalid coordinate, the processing circuit 27 inverts and displays the display color of all pixels positioned on a line segment having, as both ends thereof, a valid coordinate transferred before the invalid coordinate and the valid coordinate transferred later. Thereby, a curve approximated by broken lines in which remaining input points are connected in series, except of the invalid coordinate.

Figure 3:
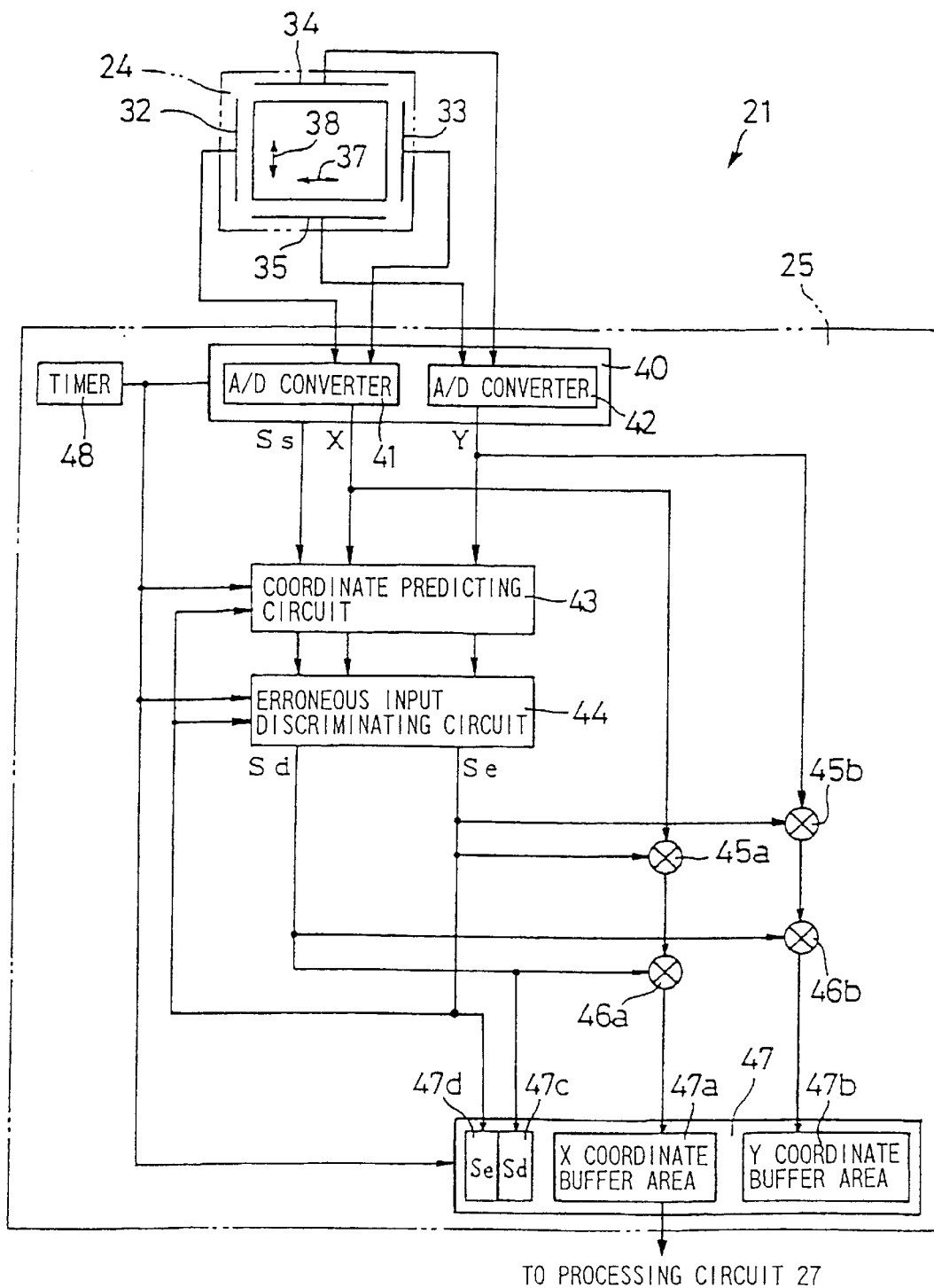
FIG. 3 is a block diagram showing a concrete structure of the coordinate input apparatus 21 in FIG. 1.

FIG. 3 is a block diagram showing a concrete structure of the coordinate input apparatus 21 in FIG. 1. The tablet 24 is realized by the analog resistor film type tablet for example.

The tablet 24 comprises a pair of transparent electrode members in which a uniform transparent conductive film is formed on one surface thereof. This transparent electrode member deforms when pressure above a predetermined pressure value is applied for example. Electrodes 32 and 33 are mounted at both ends of the transparent conductive film of one transparent electrode member in the Y direction indicated by an arrow 37. Further, electrodes 34 and 35 are mounted at both ends of the transparent conductive film of the other transparent electrode member in the X direction indicated by an arrow 38. These pair of transparent electrode members are disposed so that one surface thereof on which the transparent conductive film is formed face each other while leaving a predetermined space therebetween. The space between the transparent conductive films of one and the other transparent electrode members is kept by a dot spacer made of insulator for example.

A flat and rectangular pointing area 31 is formed on the tablet 24. The pointing area 31 is an area where the transparent conductive films in the part surrounded by the electrodes 32 through 35 face each other while leaving the space in the pair of transparent electrode members thus provided. The user presses down a point within the pointing area 31 by the pointing member, i.e. the finger or the pen, to input an input point. At this time, the user performs either point input or line input.

The tablet control circuit 25 samples voltage values between the electrodes 32, 33 and the electrodes 34, 35 per the predetermined period T. In inputting a point, one point within the pointing area 31 is continuously pressed down. In inputting a line, the pointing member is moved in the horizontal direction in parallel with the surface of the tablet 24 while pressing the tablet 24. In either case of the point input and the line input, the time during which the tablet is pressed down in one time of input is longer than at least three periods of the period T for sampling the output from the tablet 24. Therefore, the coordinate of the input point is sampled at least three times during one time of input.

When the tablet 24 is pressed down by the pointing member, the transparent conductive films of one and the other transparent electrode members causes a short circuit at that position. In detecting this position, either one pair of electrodes among the electrodes 32, 33 and the electrodes 34, 35 are used as scan electrodes and the other pair of electrodes are used as detection electrodes in one detection timing. Predetermined gradient voltage is applied between one pair of electrodes to be used as the scan electrodes. The gradient voltage is divided at the part where the transparent conductive films has shorted and the detection electrodes detect the divided voltage. The ratio of division of the gradient voltage is equal to a ratio of division by which a distance between the scan electrodes is divided at the input point. Accordingly, the ratio of division of the gradient voltage is found from the values of divided voltages detected from the detection electrodes and the coordinate of position of the input point in one direction in which the scan electrodes are disposed is obtained from this ratio.

When the electrodes 32, 33 are used as the detection electrodes and the electrodes 34, 35 are used as the scan electrodes as described above, the electrodes 32, 33 detect a voltage value which corresponds to the coordinate of the input point in the X direction. When the electrodes 32, 33 are used as the scan electrodes and the electrodes 34, 35 are used as the detection electrodes in contrary, the electrodes 34, 35 detect a voltage value which corresponds to the coordinate of the input point in the Y direction. The electrodes 32, 33 and the electrodes 34, 35 are switched as the scan electrodes and detection electrodes in a very short time. The values of the voltages detected respectively in the electrodes 32, 33 and the electrodes 34, 35 are supplied to the tablet control circuit 25 as the analog outputs from the tablet 24. The tablet control circuit 25 converts the analog outputs output from the tablet 24 into digital values and performs the discrimination of erroneous input to determine whether the input is an erroneous input or not.

The tablet control circuit 25 comprises analog/digital converter circuits 41 and 42, a coordinate predicting circuit 43, an erroneous input discriminating circuit 44, multipliers 45a, 45b; 46a, 46b, a buffer 47 and a timer 48. Operation timing of each of the circuits 41 through 44, multipliers 45a, 45b; 46a, 46b and the buffer 47 Is controlled by the timer 48. The timer 48 derives an activation output which instructs an activation of each of the components 41 through 47 with respect to each of the components 41 through 47 every time when the time of one period of the predetermined period T passes. Given the activation output, each of the components 41 through 47 is activated and processes the signal given to each. Hereinafter, the time of one period of the period T will be referred to as "time T".

In the following explanation, each of the components of the tablet control circuit 25 is assumed to be activated sequentially at times t0, t1 and t2. The interval between the times t0, t1 and t2 is the time T and it is assumed that input points P0, P1 and P2 are inputted from the tablet 24 at those times t0, t1 and t2, respectively. The past input point P0 is an input point at time t0 going back from time t1 by the time T. The latest input point P1 is an input point at time t1. The future input point P2 is an input point at time t2 advanced from time t1 by the time T. The coordinate of the past input point P0 is assumed to be a valid coordinate which is determined to be valid in the erroneous input discriminating circuit 44 described later. At this time, the coordinate of a past output point Q0 at time t0 stored in the buffer 47 is equal to the coordinate of the input point P0.

Figure 4:
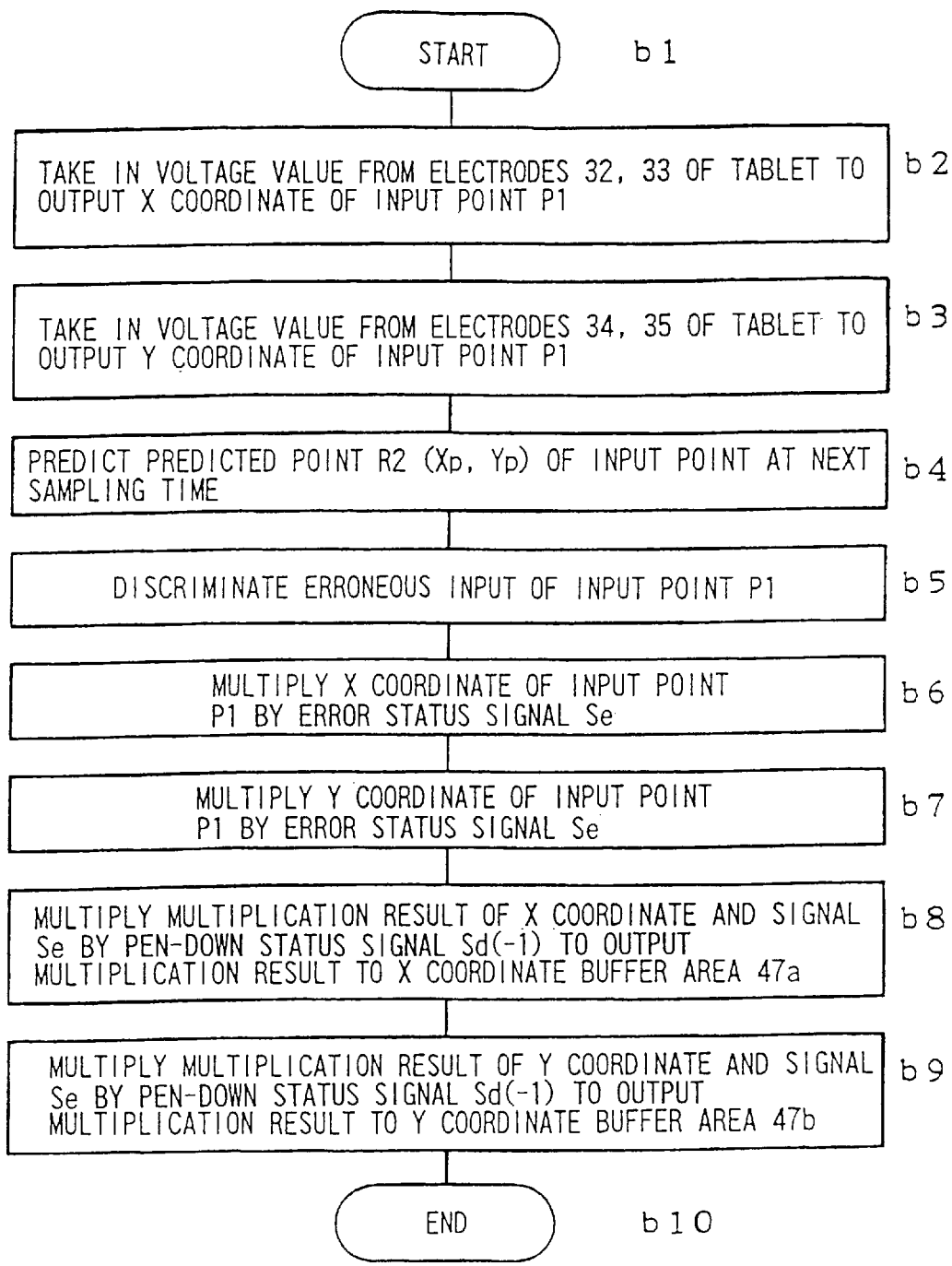
FIG. 4 is a flowchart for explaining a processing operation in the tablet control circuit 25 in FIG. 3.

FIG. 4 is a flowchart for explaining a processing operation in the tablet control circuit 25 in detail. The explanation will be made with reference to both FIGS. 3 and 4. The operation which will be explained below is assumed to be performed at time t1.

When the activation output is derived at time t1, the process advances from Step b1 to Step b2. At Step b2, the analog/digital converter circuit 41 of a sampling circuit 40 samples a voltage value, i.e. an analog value, which is detected when the electrodes 32, 33 are used as the detection electrodes to convert into a digital value. The digital value of the voltage value of the electrodes 32, 33 sampled at time t1 is assumed to be X coordinate X1 of the coordinate of the latest input point P1. The X coordinate X1 of the latest input point P1 is supplied to the coordinate predicting circuit 43 and the multiplier 45a. When the X coordinate X1 of the input point P1 is output, the process advances from Step b2 to Step b3.

At Step b3, the analog/digital converter circuit 42 of the sampling circuit 40 samples a voltage value which is detected when the electrodes 34, 35 of the tablet 24 are used as the detection electrodes to convert it from analog to digital. The digital value of the voltage value of the electrodes 34, 35 sampled at time t1 is assumed to be Y coordinate Y1 of the coordinate of the latest input point P1. The X coordinate X1 and the Y coordinate Y1 are detected actually at different timings shifted from each other by a very small period of time from time t1. The Y coordinate Y1 of the latest input point P1 is supplied to the coordinate predicting circuit 43 and the multiplier 45b. When the Y coordinate Y1 of the input point P1 is output, the process advances from Step b3 to Step b4.

Further, when the sampling circuit 40 succeeds in sampling the coordinate (X1, Y1) of the latest input point P1, it outputs a sampling status signal Ss which indicates that to the coordinate predicting circuit 43. The signal Ss takes a value of either "1" or "0". The signal Ss becomes "1" when the tablet 24 is pressed and becomes "0" when it is not. The sampling status signal Ss is handled as a pen-down status signal Sd1 at time t1 in the components 43 through 47 which follow.

At Step b4, a predicted point R2 (Xp, Yp) of the future input point P2 at time t2 is found in the coordinate predicting circuit 43 after passing by the time T from time t1. The valid coordinate (X0, Y0) of the past input point P0 has been stored in the coordinate predicting circuit 43 in advance. When the past input point P0 is supplied to the coordinate predicting circuit 43, the values of the coordinate of the output point Q0 output from the tablet control circuit 25 are equal with that of the input point P0 and are (X0, Y0).

The predicted coordinate (Xp, Yp) of the predicted point R2 at time t2 is found based on the coordinate (X1, Y1) of the input point P1 at time t1 and the coordinate (X0, Y0) of the input point P0 at time to by the method described later. The predicted point R2 (Xp, Yp) thus found is supplied to the erroneous input discriminating circuit 44 to be used for the discrimination of erroneous input at time t2. Further, in this coordinate predicting operation, the coordinate predicting circuit 43 derives a pen-down status signal Sd0 at time t0 from the sampling circuit 40 at time t0 to the erroneous input discriminating circuit 44. In the same time, it stores a pen-down status signal Sd1 at time t1 from the sampling circuit 40 to a register described later. When the predicted coordinate (Xp, Yp) of the predicted point R2 is output, the process advances from Step b4 to Step b5.

At Step b5, the erroneous input discriminating circuit 44 performs the error input discriminating operation of the latest input point P1 and outputs an error status signal Se1 at time t1 which indicates the discrimination result. The predicted coordinate of the predicted point R1 of the input point P1 is found by the coordinate predicting circuit 43 during the input discriminating operation at time 0, i.e. at the sampling time of one period before. The method how to discriminate an erroneous input will be described later.

The error status signal Se assumes an either value of "1" or "0". When the coordinate (X1, Y1) of the latest input point P1 is determined to be a correct valid coordinate at time t1, the error status signal Se1 turns out to be "1". When the latest input point P1 is determined to be an erroneous input and is an invalid coordinate, the error status signal Se1 turns out to be "0". The output from the erroneous input discriminating circuit 44 is supplied to the multipliers 45a and 45b, a register 47c of the buffer 47 and the coordinate predicting circuit 43. Further, the error status signal Se1 is supplied also to the erroneous input discriminating circuit 44 itself as described later. When the discrimination of erroneous input is finished, the process advances from Step b5 to Step b6.

During the erroneous input discriminating operation, the erroneous input discriminating circuit 44 also derives a pen-down status signal Sd(-1) at time t(-1) given at time t0 to the multipliers 46a and 46b and a register 47d of the buffer 47. Time t(-1) is time going back from time t0 by the time T. In the same time, the pen-down status signal Sd0 at time t0 supplied from the coordinate predicting circuit 43 is stored in a register described later. When the error status signal Se1 at time t1 is "0" and the input point is determined to be an erroneous input, the registers described later in which the pen-down status signals Sd1 and Sd0 are stored is initialized to zero the values to be stored.

At Step b6, a first definition step for defining or converting the X coordinate X1 of the input point P1 by the discrimination result of the erroneous input discriminating operation is performed by the multiplier 45a. In the first definition step of the X coordinate at time t1, the X coordinate X1 of the input point P1 output from the analog/digital converter circuit 41 is multiplied with the error status signal Se1 at time t1 output from the erroneous input discriminating circuit 44. Because the signal Se1 is "1" when the coordinate (X1, Y1) of the latest input point P1 is valid coordinate, the output of the multiplication in the multiplier 45a turns out to be "X1". Because the signal Se1 is "0" when the coordinate (X1, Y1) of the latest input point P1 is invalid coordinate, the output of the multiplication in the multiplier 45a turns out to be "0". The output from the multiplier 45a is supplied to the multiplier 46a. When the first definition step of the X coordinate X1 is finished, the process advances from Step b6 to Step b7.

At Step b7, a first definition step for the Y coordinate is carried out by the multiplier 45b. In the first definition step for the Y coordinate at time t1, the Y coordinate Y1 of the input point P1 output from the analog/digital converter circuit 42 is multiplied with the error status signal Se1 at time t1 from the erroneous input discriminating circuit 44. When the signal Se1 is "1", the multiplier 45b outputs "Y1". When the signal Se1 is "0", the multiplier 45b outputs "0". Coordinate Input Apparatus The output of the multiplier 45b is supplied to the multiplier 46b. When the first definition step for the Y coordinate Y1 is finished, the process advances from Step b7 to Step b8.

That is, in the first definition operation in the multipliers 45a and 45b, when the coordinate (X1, Y1) of the input point P1 is valid coordinate, the coordinate is defined as it is. When the coordinate (X1, Y1) is invalid coordinate, the coordinate is converted to a predetermined coordinate (0, 0). Thereby, it becomes possible to prevent the coordinate of the input point erroneously inputted from becoming a coordinate of the output point.

At Step b8, a second definition step for determining whether the X coordinate defined in the first definition step should be output or not is carried out n the multiplier 46a. In the second definition step for the X coordinate at time t1, the values of coordinate output from the multiplier 45a is multiplied with the pen-down status signal Sd(-1) at time t(-1). The multiplier 46a outputs "X1" only when the X coordinate is valid coordinate "X1" and the signal Sd(-1) is "1". The multiplier 46a outputs "0" any time when the X coordinate is invalid coordinate "0" or when the signal Sd(-1) is "0". The output of the multiplier 46a is stored in an X coordinate buffer area 47a of the buffer 47 as X coordinate of a latest output point Q1 at time t1. When the second definition step for the X coordinate is finished, the process advances from Step b8 to Step b9.

At Step b9, a second definition step for the Y coordinate is carried out in the multiplier 46b. In the second definition step for the Y coordinate at time t1, the values of coordinate output from the multiplier 45b is multiplied with the pen-down status signal Sd(-1) at time t(-1). The multiplier 46b outputs "Y1" only when the value of coordinate is valid coordinate "Y1" and the signal Sd(-1) is "1". The multiplier 46b outputs "0" any time when the value of coordinate is invalid coordinate "0" or when the signal Sd(-1) is "0". The output of the multiplier 46b is stored in a Y coordinate buffer area 47b of the buffer 47 as Y coordinate of the latest output point Q1 at time t1. When the operation for the Y coordinate is finished, the process advances from Step b9 to Step b10, thus ending the operation of the process of the flowchart.

That is, in the second definition operation in the multipliers 46a and 46b, the defined coordinates are output as they are only when the valid coordinates can be obtained continuously in the input discriminating operation at times t(-1), t0 and t1. When they cannot be obtained, the defined coordinate is converted to the predetermined coordinate (0, 0) to be output.

The erroneous input discriminating operation of an input point is carried out by using two valid coordinates obtained by going back to the past from the time of input of the coordinate to be discriminated. Therefore, the erroneous input discriminating operation cannot be carried out when those coordinates cannot be obtained. The multipliers 46a and 46b output the valid coordinate only when the erroneous input discriminating operation can be carried out. Accordingly, it becomes possible to prevent the coordinate which is defined in the multipliers 46a, 46b when the discrimination or erroneous input cannot be carried out from being the coordinate of the output point.

Thereby, when the input discriminating operation at time t1 is finished, the X coordinate and Y coordinate of the output point Q1 at time t1 are stored in the buffer areas 47a and 47b of the buffer 47, respectively. When the coordinate of the latest coordinate P1 is the valid coordinate and when two or more valid coordinates are output continuously from the past, the values of the coordinate (X1, Y1) sampled from the analog output from the tablet 24 are stored as the coordinate of the output point Q1 as it is. When the latest coordinate P1 is the point erroneously inputted or when a number of valid coordinates output continuously in the past is less than 2, (0, 0) is stored as the coordinate of the output point Q1. The pen-down status signal Sd(-1) at time t(-1) and the error status signal Se1 at time t1 are also stored in the registers 47c and 47d of the buffer 47.

The processing circuit 27 reads the contents stored in each of the buffer areas 47a through 47d of the buffer 47. At this time, it sets the values stored in the areas 47a and 47b as the values of coordinate of the output point Q1 to be processed only when the values of the signals Sd and Se in the areas 47c and 47d are both "1". That is, the coordinate which is the output of the tablet 24 converted to the digital value is supplied to the processing circuit 27 only when the discrimination of an erroneous input is allowed and when the coordinate of the input point is valid. When it is not the case, the values of coordinate (0, 0) are given to the processing circuit 27. It allows the coordinate erroneously inputted to be eliminated. Further, although it is conceivable that (0, 0) is output as a valid coordinate of an input point, it is possible to distinguish the coordinate (0, 0) output when the coordinate is invalid coordinate and when the discrimination of erroneous input is disallowed from the coordinate (0,0) output when the coordinate is valid because the both signals Sd and Se become "1" at this time.

The coordinate predicting circuit 43 finds the predicted coordinate (Xp, Yp) of the predicted point R2 of the next input point P2 based on the coordinate (X1, Y1) of the latest input point P1 at time t1 and the coordinate (X0, Y0) of the past input point P0 at time t0.

Figure 6:
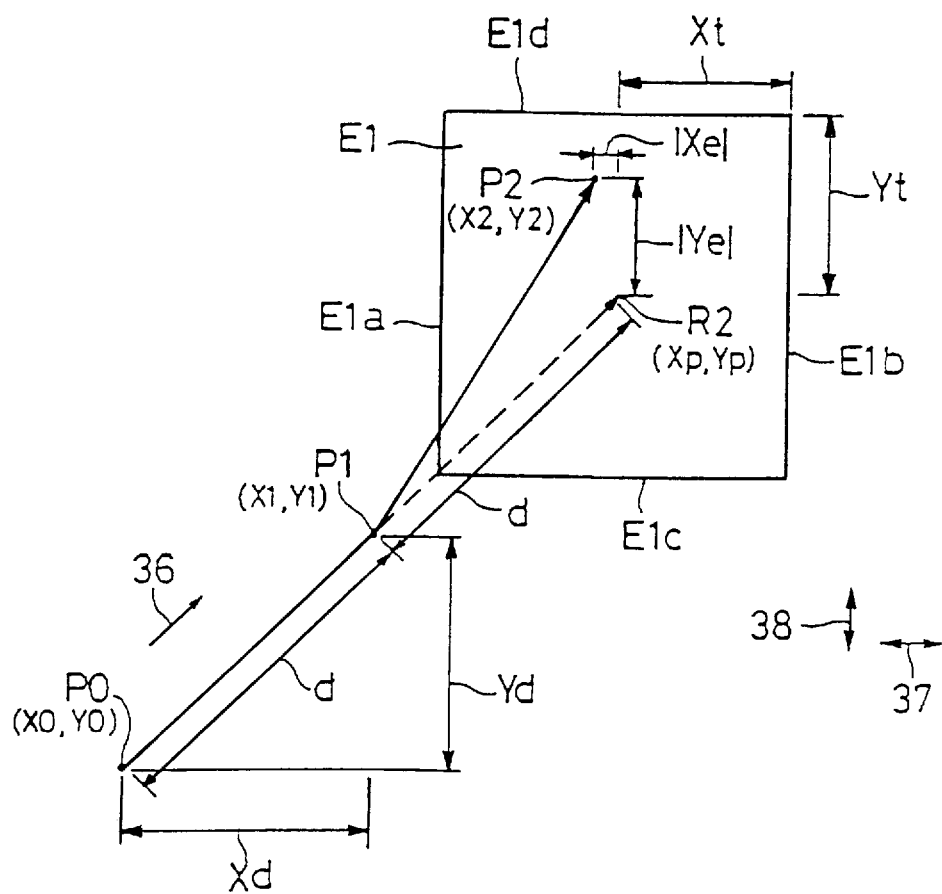
FIG. 6 is a diagram showing a relationship of positions of a latest input point P1, a past input point P0, a future input point P2 and a prediction point R2 of the input point P2 when the future input point P2 is valid, and a predicted coordinate area E1.

FIG. 6 is a diagram showing a relationship of positions of the latest input point P1, the past input point P0, the future input point P2 and the prediction point R2 of the input point P2. The predicted point R2 is the position advanced from the latest input point P1 by a distance d in the advance direction indicated by an arrow 36. The advance direction is the direction extending from the past input point P0 to the latest input point P1. When a plurality of input points are inputted continuously, this advance direction is equal with the tangent direction of a curve drawn within the pointing area 31 at the input point P0. The distance d is a distance from the past input point P0 to the latest input point P1.

The predicted point R2 is the center point of a predicted coordinate area E1 in which the future input point P2 should exist. When the future input point P2 (X2, Y2) exists within the quadrilateral predicted coordinate area E1, the erroneous input discriminating circuit 44 determines that the values of the coordinate of the input point is valid. This predicted coordinate area E1 is a quadrilateral in which each side is parallel with axes of coordinate of the coordinate system showing the input point. That is, the sides E1a and E1b are parallel with the axis of coordinate in the Y direction. Similarly, the sides E1c and E1d are parallel with the axis of coordinate in the X direction. In the tablet 24 of the coordinate input apparatus 21, the coordinate system is an XY orthogonal coordinate system. Accordingly, the predicted coordinate area E1 turns out to be a rectangular area.

Figure 5:
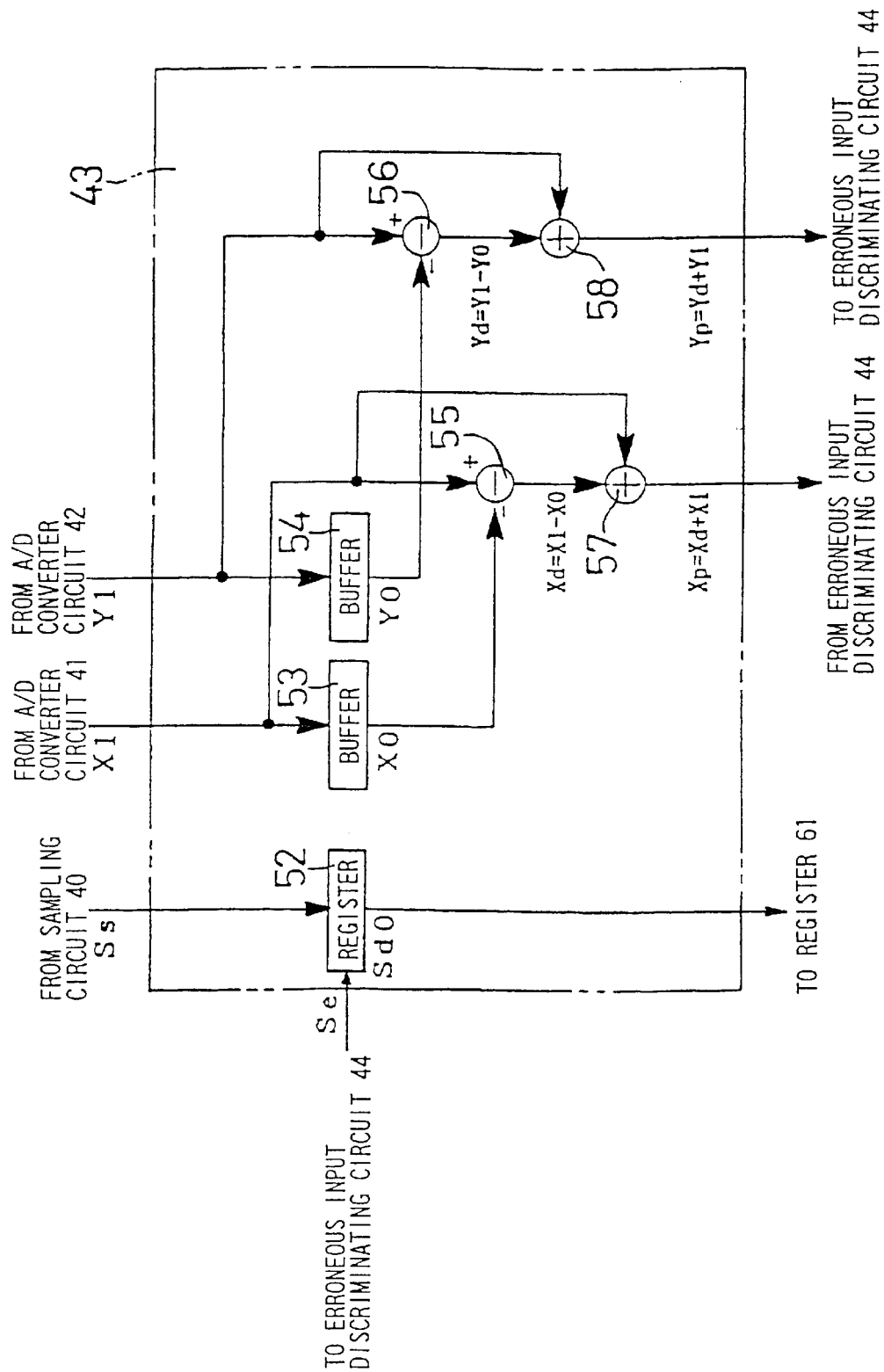
FIG. 5 is a block diagram showing a concrete structure of a coordinate predicting circuit 43 of the tablet control circuit 25.
Figure 7:
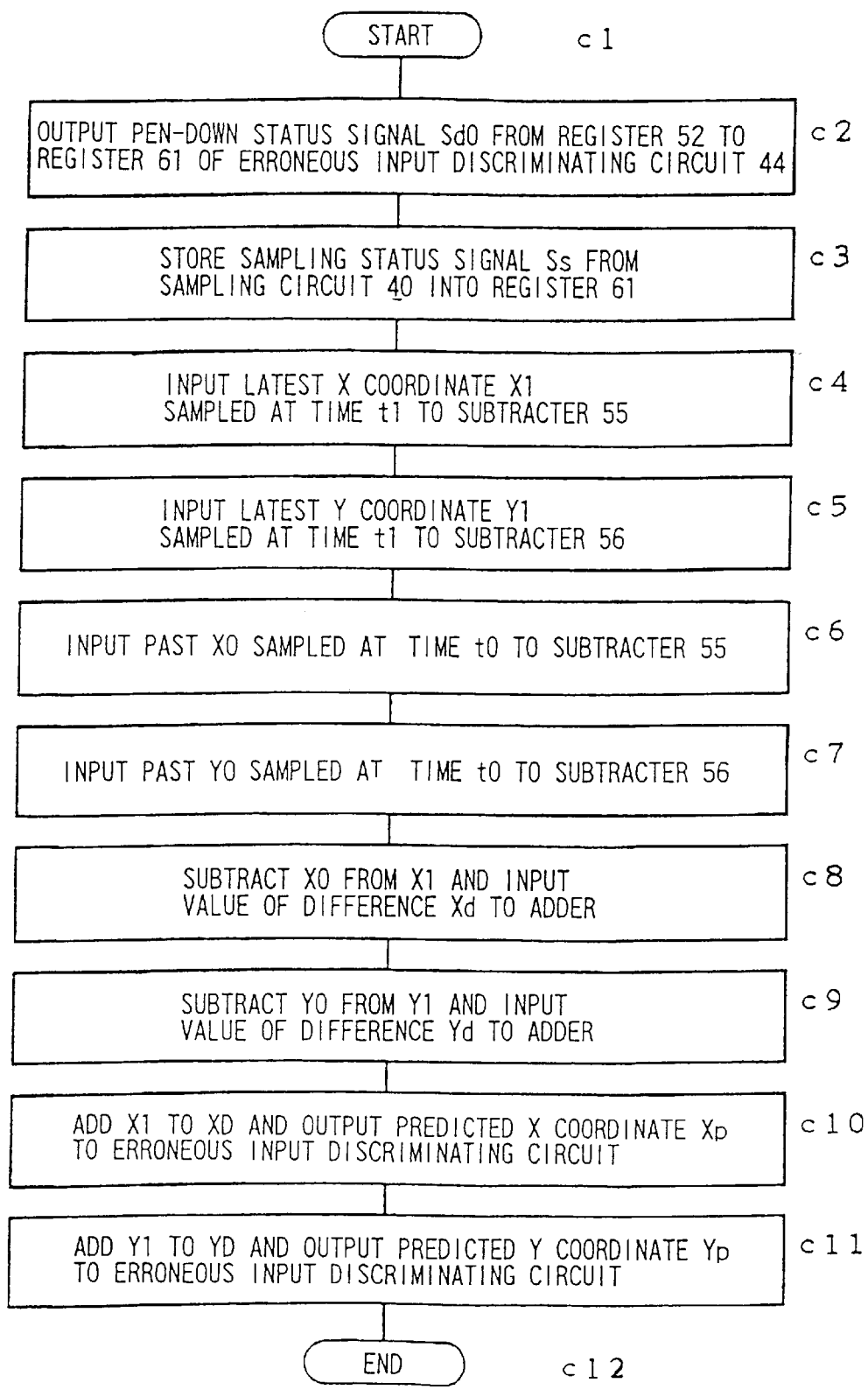
FIG. 7 is a flowchart for explaining a coordinate predicting operation of the coordinate predicting circuit 43 in FIG. 5.

FIG. 5 is a block diagram showing a concrete structure of the coordinate predicting circuit 43 of the tablet control circuit 25 in FIG. 3. FIG. 7 is a flowchart for explaining the coordinate predicting operation of the coordinate predicting circuit 43 in FIG. 5. The explanation will be made with reference to both FIGS .5 and 7. The operati on explained below is assumed to be performed at time t1.

The coordinate predicting circuit 43 comprises a register 52, buffers 53 and 54, subtracters 55 and 56 and adders 57 and 58. A sampling status signal Ss output from the sampling circuit 40 Is stored in the register 52 as a pen-down status signal Sd. Values of coordinate sampled by the sampling circuit 40 at the past sampling going back by one period of time T are stored in the buffers 53 and 54. For instance, the pen-down status signal Sd0 at time t0 and the coordinate (X0, Y0) of the past input point P0 are stored in the register 52 as well as the buffers 53 and 54, respectively, just before when the coordinate predicting operation at time t1 is carried out.

When the timer 48 derives the activation output, the process advances from Step c1 to Step c2. At Step c2, the pen-down status signal Sd0 stored in the register 52 is output to supply to a register 61 of the erroneous input discriminating circuit 44. When the signal Sd0 is output, the process advances to Step c3. At Step c3, the sampling status signal Ss output from the sampling circuit 40 is stored in the register 52 as the pen-down status signal Sd1 at time t1. When the signal Sd1 is stored, the process advances to Step c4. Due to this operation, the pen-down status signal Sd given to the circuit 43 is output from the circuit 43 by being delayed by one period of time T.

At Step c4, the X coordinate X1 of the latest input point P1 sampled at time t1 is supplied to the subtracter 55 from the analog/digital converter circuit 41. The X coordinate X1 of the input point P1 is also supplied to and stored in the buffer 53. After supplying the X coordinate X1, the process advances from Step c4 to Step c5. At Step c5, the Y coordinate Y1 of the latest input point P1 sampled at time t1 is supplied to the subtracter 56 from the analog/digital converter circuit 42. The Y coordinate Y1 of the input point P1 is also supplied to and stored in the buffer 54. After supplying the Y coordinate Y1, the process advances from Step c5 to Step c6.

At Step c6, X0 of the past input point P0 sampled at time t0 is supplied to the subtracter 55 from the buffer 53. After supplying the past X0, the process advances to Step c7. At Step c7, Y coordinate Y0 of the past input point P0 is supplied to the subtracter 56. After supplying the Y0, the process advances to Step c8.

At Step c8, the X coordinate X0 of the past input point P0 is subtracted from the X coordinate X1 of the latest input point P1 in the subtracter 55 to find a value of difference Xd:

$$Xd = X1 - X0 \tag{1}$$

After obtaining the value of difference Xd, the value Xd is supplied to the adder 57. After supplying the value of difference Xd, the process advances to Step c9. At Step c9, the Y coordinate Y0 of the past input point P0 is subtracted from the Y coordinate Y1 of the past input point P1 in the subtracter 56 to find a value of difference Yd:

$$Yd = Y1 - Y0 \tag{2}$$

The value of difference Yd thus obtained is supplied to the adder 58. After supplying the value of difference Yd, the process advances to Step c10.

At Step c10, the value of difference Xd is added to the X coordinate X1 of the latest input point P1 to obtain X coordinate Xp of the predicted point R2:

$$Xp = Xd + X1 \tag{3}$$

The X coordinate Xd of the predicted point R2 thus obtained (hereinafter abbreviated as "predicted X coordinate") is supplied to the erroneous input discriminating circuit 44. After obtaining the predicted X coordinate Xd, the process advances to Step c11. At Step c11, the value of difference Yd is added to Y coordinate Y1 of the latest input point P1 to obtain a Y coordinate Yp of the predicted point R2 (hereinafter abbreviated as "predicted Y coordinate"):

$$Yp = Yd + Y1 \tag{4}$$

The predicted Y coordinate Yp thus obtained is supplied to the erroneous input discriminating circuit 44. After obtaining the predicted Y coordinate Yp, the process advances to Step c12, ending the operation of the process in the flowchart.

When two or more input points are obtained in the past continuously, the coordinate predicting circuit 43 thus predicts the coordinate of position of the input point to be obtained in the next sampling based on those input points already obtained.

Figure 8:
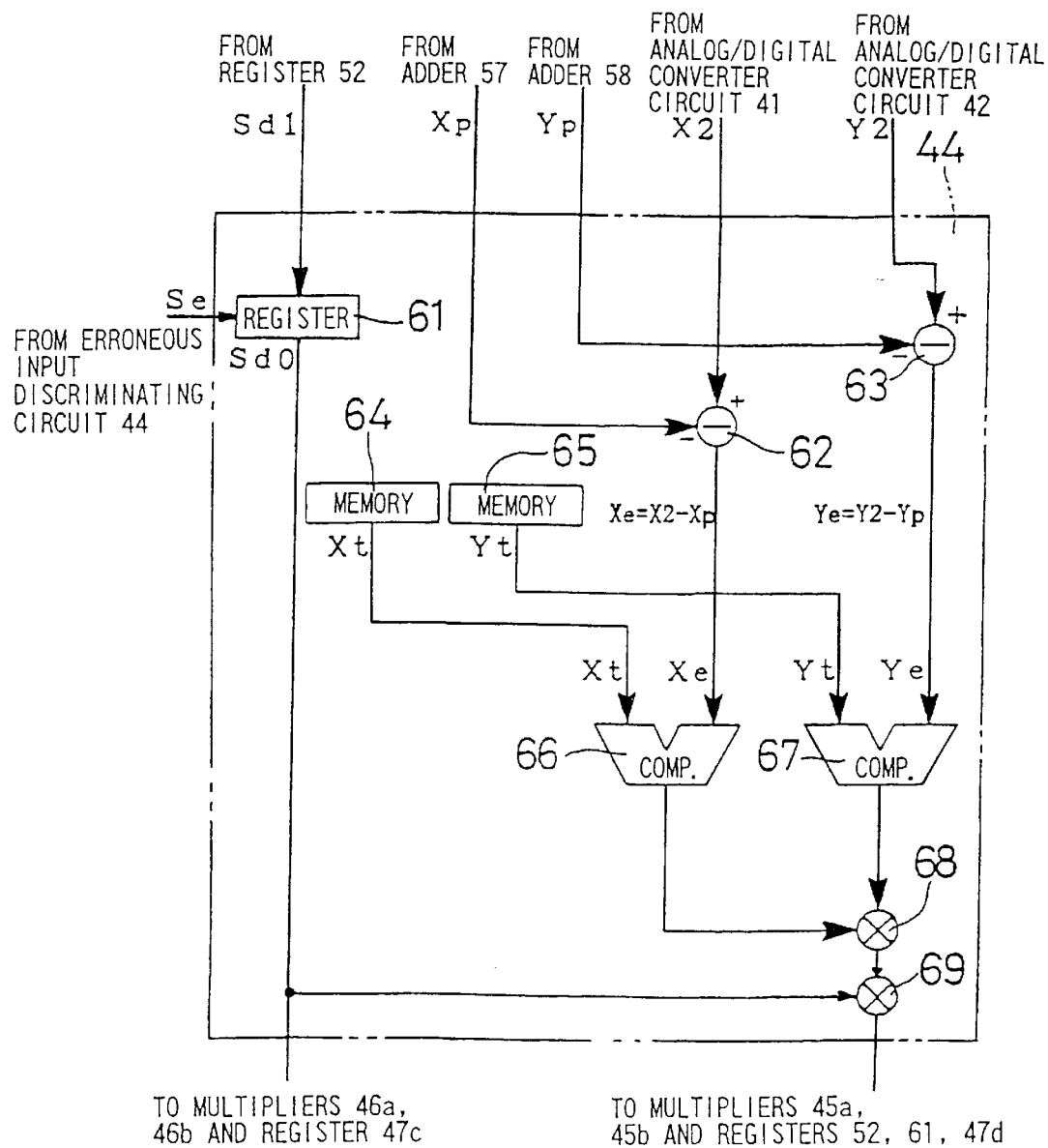
FIG. 8 is a block diagram showing a concrete structure of an erroneous input discriminating circuit 44 of the tablet control circuit 25.
Figure 9:
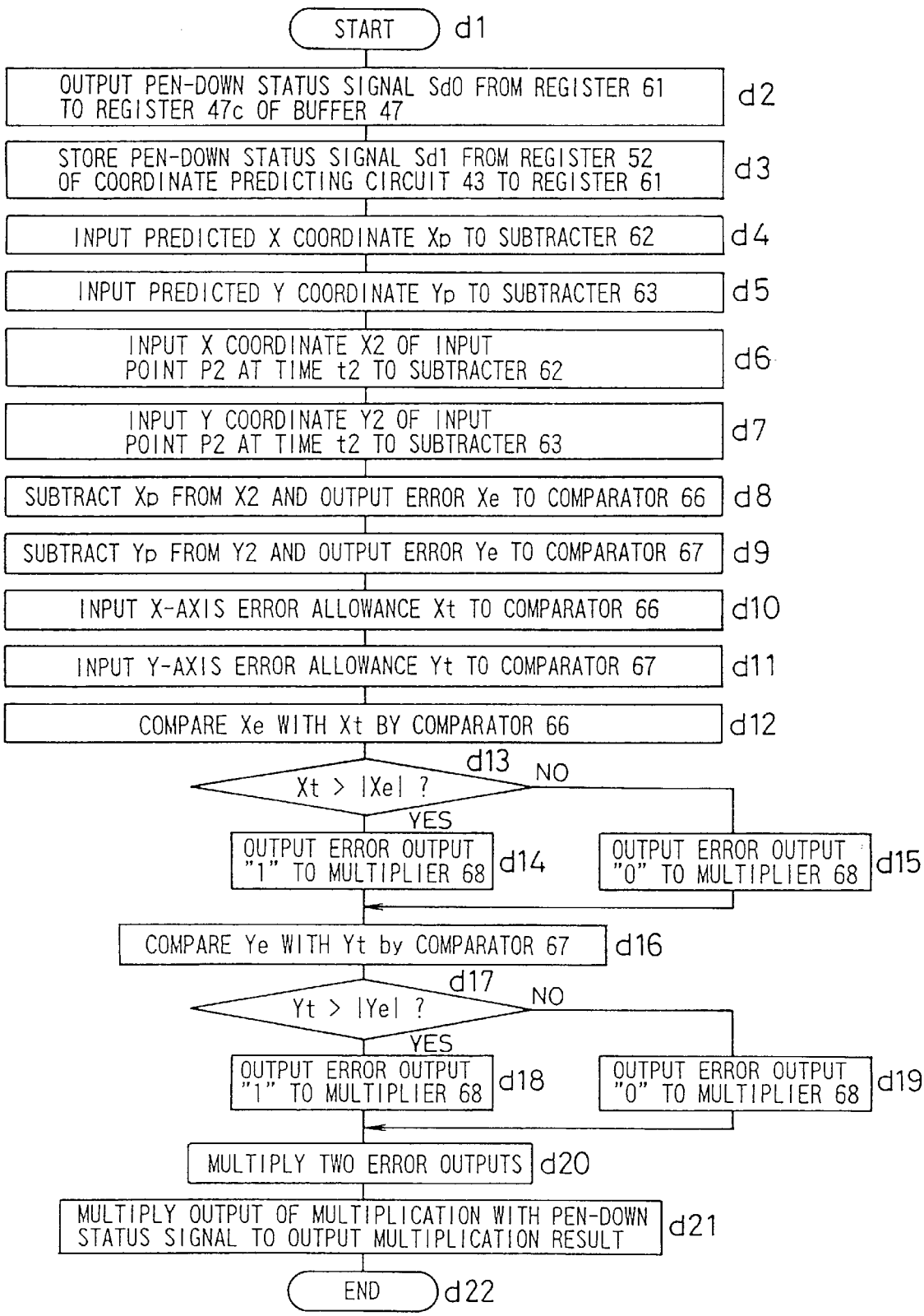
FIG. 9 is a flowchart for explaining the erroneous input discriminating operation of the erroneous input discriminating circuit 44 in FIG. 8.

FIG. 8 is a block diagram showing a concrete structure of the erroneous input discriminating circuit 44 in FIG. 3. FIG. 9 is a flowchart for explaining the erroneous input discriminating operation of the erroneous input discriminatingcircuit 44. The explanation will be made below with reference to both FIGS. 8 and 9. The discriminating operation explained below is assumed to be performed at time t2.

The erroneous input discriminating circuit 44 comprises a register 61, subtracters 62 and 63, memories 64 and 65, comparators 66 and 67 and multipliers 68 and 69. The register 61 stores the pen-down status signal Sd at the time of operation going back by twice of time of the time T from the present input discriminating operation. A predetermined X-axis error allowance Xt and Y-axis error allowance Yt are stored in the memories 64 and 65, respectively. For example, the pen-down status signal Sd0 at time t0 is stored in the register 61 just before time t2.

At time t2, the sampling circuit 40 samples values of voltage between the electrodes 32, 33; 34, 35 at time t2 to obtain values of coordinate (X2, Y2) of the input point P2. The coordinate (X2, Y2) of the input point P2 is given to the coordinate predicting circuit 43 to be used to determine a predicted point of the input point at time t3 after passing from time t2 by the time T. The erroneous input discriminating circuit 44 determines whether the future input point P2 (X2, Y2) is contained within the predicted coordinate area E1 centering on the predicted point R2 found by the coordinate predicting circuit 43.

In the flowchart in FIG. 9, the process advances from Step d1 to Step d2 when the activation output is derived from the timer 48 at time t2. At Step d2, the pen-down status signal Sd0 stored in the register 61 is output to be given to the multipliers 46a and 46b as well as the register 47c described before. The signal Sd0 is used in the second discrimination process and in the process of the processing circuit 27. The signal Sd0 is given also to the multiplier 69 of the erroneous input discriminating circuit 44. After outputting the signal Sd0, the process advances to Step d3. At Step d3, the pen-down status signal Sd1 at time t1 output from the register 52 of the coordinate predicting circuit 43 is stored to the register 61. After storing the signal Sd1, the process advances to Step d4. Due to this operation, the pen-down status signal Sd given to the erroneous input discriminating circuit 44 is output from the circuit 44 by being delayed by one period of time T.

Thereby, the sampling status signal Ss output from the sampling circuit 40 is used in the second discriminating step after being delayed by two periods of time (2×T) from the sampling operation output from the sampling circuit 40 of the circuits 43 and 44. Accordingly, the coordinate of the input point P from the sampling circuit 40 is not output as the coordinate of the output point Q unless valid coordinates of the input points P are inputted at least three times continuously. Accordingly, the output point Q is suppressed until when the predicted coordinate R is predicted and the discrimination of erroneous input is allowed.

At Step d4, the predicted X coordinate Xp output from the adder 57 of the coordinate predicting circuit 43 is inputted to the subtracter 62. Then, the process advances to Step d5.

At Step d5, the predicted Y coordinate Yp output from the adder 58 of the coordinate predicting circuit 43 is inputted to the subtracter 63. Then, the process advances to Step d6. At Step d6, the X coordinate X2 of the future input point P2 is inputted from the analog/digital converter circuit 41 of the sampling circuit 40 to the subtracter 62. Then, the process advances to Step d7. At Step d7, the Y coordinate Y2 of the future input point P2 is inputted from the analog/digital converter circuit 42 to the subtracter 63. Then, the process advances to Step d8. Thereby, the X coordinate and the Y coordinate of the predicted point R2 and the input point P2 are supplied to the subtracters 62 and 63, respectively.

At Step d8, the predicted X coordinate Xp is subtracted from the X coordinate X2 of the future input point P2 to find an error Xe of the X coordinate:

$$Xe = X2 - Xp \tag{5}$$

The error Xe thus found is given to the comparator 66. After determining the error Xe, the process advances to Step d9. At Step d9, the predicted Y coordinate Yp is subtracted from the Y coordinate Y2 of the future input point P2 to find an error Ye of the Y coordinate:

$$Ye = Y2 - Yp \tag{6}$$

The error Ye thus found is given to the comparator 67. After determining the error Ye, the process advances to Step d10.

At Step d10, the X-axis error allowance Xt stored in the memory 64 is supplied to the comparator 66. Then, the process advances to Step d11. At Step d11, the Y-axis error allowance Yt stored in the memory 65 is supplied to the comparator 67. Then, the process advances to Step d12.

At Step d12, the error Xe in the X direction is compared with the X-axis error allowance Xt in the comparator 66. Then, the process advances to Step d13. At Step d13, it is determined whether the absolute value |Xe| of the error Xe of the X coordinate is less than the X-axis error allowance Xt. The comparator 66 outputs an error output which indicates the result of comparison of the absolute value |Xe| and the allowance Xt. The error output assumes either value of "1" or "0" in correspondence to the relationship of values of the absolute value |xe| and the allowance Xt.

That is, it is determined in the comparator 66 whether the X coordinate X2 of the future input point P2 exists within the range from the value (Xp−Xt) separated from the predicted X coordinate Xp of the predicted point R2 at time t2 by the X-axis error allowance Xt in the decremental direction of the value of coordinate on the X coordinate axis to the value (Xp+Xt) separated from the predicted X coordinate Xp by the allowance Xt in the incremental direction of the value of coordinate. When the position of the coordinate P2 in the X-axis direction is contained in the predicted coordinate range E1 as shown in FIG. 6, the absolute value |Xe| of the error Xe in the X direction is less than the value of the X-axis error allowance Xt.

Reference will be made again to FIGS. 8 and 9. When the absolute value |Xe| of the error Xe of the X coordinate is less than the X-axis error allowance Xt, the process advances from Step d13 to Step d14. At Step d14, the error output whose value is "1" is output from the comparator 66. This error output "1" is supplied to the multiplier 68:

$$1{:}Xt > |Xe| \tag{7}$$

When the absolute value |Xe| is the allowance Xt or more, the process advances from Step d13 to Step d15. At Step d15, the error output whose value is "0" is output from the comparator 66 to the multiplier 68:

$$0: Xt \leq |Xe| \qquad (8)$$

Thereby, when the future input point P2 exists within the range pinched by the sides E1a and E1b with respect to the X-axis direction indicated by an arrow 37 in FIG. 6, the comparator 66 outputs the error output "1". When the input point P2 exists out of the range with respect to the X-axis direction, the error output "0" is output. When the error output of "1" or "0" is output to the multiplier 68, the process advances from Steps d14 and d15 to Step d16.

At Step d16, the error Ye in the Y direction is compared with the Y-axis error allowance Yt in the comparator 67. Then, the process advances to Step d17. At Step d17, it is determined whether an absolute value |Ye| of the error Ye in the Y-axis direction is less than the Y-axis error allowance Yt. The comparator 67 outputs an error output which indicates the result of comparison of the absolute value |Ye| and the allowance Yt. The error output assumes either value of "1" or "0" in correspondence to the relationship of values of the absolute value |Ye| and the allowance Yt. When the position of the coordinate P2 in the Y-axis direction is contained in the predicted coordinate range E1, the absolute value |Ye| of the error Ye of the Y coordinate is less than the value of the Y-axis error allowance Yt as shown in FIG. 6.

When the absolute value |Ye| is less than the allowance Yt, the process advances from Step d17 to Step d18 and the error output "1" is output to the multiplier 68:

$$1: Yt > |Ye| \qquad (9)$$

When the absolute value |Ye| is the Y-axis error allowance Yt or more, the process advances from Step d17 to Step d19 and the error output "0" is output to the multiplier 68:

$$0: Yt \leq |Ye| \qquad (10)$$

Thereby, when the future input point P2 exists within the range pinched by the sides E1c and E1d with respect to the Y-axis direction indicated by an arrow 38 as shown in FIG. 6, the comparator 67 outputs the error output "1". When the input point P2 is not contained there, the error output "0" is output. When the error output of the Y coordinate is output to the multiplier 68, the process advances from Steps d18 and d19 to Step d20.

At Step d20, the error outputs of the X and Y coordinates supplied from the comparators 66 and 67 are multiplied in the multiplier 68. When the value of either one of the error outputs of the X and Y coordinates is "0", the value obtained as a result of the multiplication in the multiplier 68 turns out to be "0". When the values of the error outputs of the X and Y coordinates are both "1", the multiplication result turns out to be "1". That is, the value obtained as a result of the multiplication turns out to be "1" only when the absolute value |Xe| of the error Xe of the X coordinate is less than the X-axis error allowance Xt and when the absolute value |Ye| of the error Ye of the Y coordinate is less than the Y-axis error allowance Yt. The value turns out to be "0" in cases other than that. The multiplication result of the multiplier 68 is given to the multiplier 69. After the multiplication, the process advances from Step d20 to Step d21.

At Step d21, the multiplication result of the multiplier 68 is multiplied with the pen-down status signal Sd0 at time t0 in the multiplier 69. This multiplication result is output as an error status signal Se2 at time t2. The signal Se2 assumes a value of either "1" or "0". The signal Se2 turns out to be "1" only when the value of the multiplication result of the multiplier 68 and the signal Sd0 are both "1". The signal Se2 turns out to be "0" when either of the value of the multiplication result or the signal Sd0 is "0". When the error status signal Se2 is output, thus ending the operation of the process in the flowchart.

The error status signal Se2 is supplied to the multipliers 45a, 45b of the tablet control circuit 25 and the register 47d of the buffer 47 described above, respectively, to be used for the first definition process and the process in the processing circuit 27.

The error status signal Se2 is also supplied to the registers 52 and 61 of the circuits 43 and 44. When the signal Se2 is "0", those registers 52 and 61 are reset, thus storing "0". Thereby, when it is determined in the erroneous input discriminating circuit 44 that the input point P2 is inputted erroneously, the values of the pen-down status signals Sd1 and Sd2 during the previous and present sampling operations are deleted. Therefore, when the erroneous input occurs, the pen-down status signal Sd whose value is "1" is not supplied to the multipliers 46a and 46b until when input points P of effective coordinates are inputted twice again. Accordingly, the coordinates of the input points P sampled at least two times of operation are suppressed from being output from the next operation of the sampling operation during which the erroneous input has occurred. In the same time, the error status signal Se whose value is "1" is suppressed from being outputted from the erroneous input discriminating circuit 44.

The coordinate predicting circuit 43 finds the predicted point R based on the two input points P sampled continuously as described above. Therefore, when the erroneous input occurs, the predicted point R used in two times of sampling operation which is performed following to the occurrence of the erroneous input is what is found using the invalid coordinate of the input point P. At this time, there may a case when the predicted point R itself is wrong. Accordingly, there may be case when the discrimination result of the erroneous input discriminating operation using those predicted points R is wrong. The error status signal Se keeps the value "0" at least until when the value of the pen-down status signal Sd turns out to be "1". Thereby, it becomes possible to prevent the coordinate of the input point P from being defined as the coordinate of the output point Q as it is until when the erroneous input discriminating operation can be performed normally. Further, it becomes possible to prevent the registers 52 and 61 from being reset again by the error of the erroneous input discriminating operation.

Figure 10:
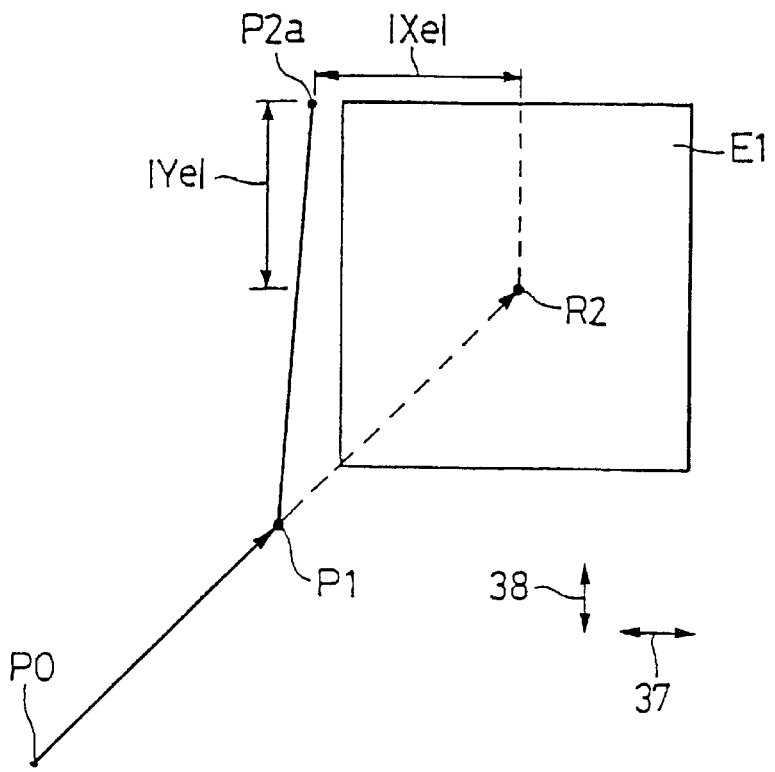
FIG. 10 is a diagram showing a relationship of positions of the latest input point P1, the past input point P0, the future input point P2 and the prediction point R2 of the input point P2 when the future input point P2 is invalid, and the predicted coordinate area E1.

In the erroneous input discriminating operation described above, the error status signal Se2 turns out to be "1"when the future input point P2 is contained within the predicted coordinate area E1 centering on the predicted point R2 as shown in FIG. 6. Further, when a future coordinate P2 a exists out of the predicted coordinate area E1, the error status signal Se2 turns out to be "0"as shown in FIG. 10.

The predicted coordinate area E1 is a rectangular area centering on the predicted point R2. Accordingly, the errors of the error allowances Xt and Yt are permitted respectively in the incremental and decremental directions of the values of coordinate along the X-axis and Y-axis centering on the coordinate (Xp, Yp) of the predicted point R2. Therefore, the coordinate is determined to be valid even when a displacement from the latest input point P1 to the future input point P2 is smaller than a displacement from the past input point P0 to the latest input point P1. A case of drawing a curve having a large curvature may be cited as the case when the displacement of the coordinate decreases.

Figure 11:
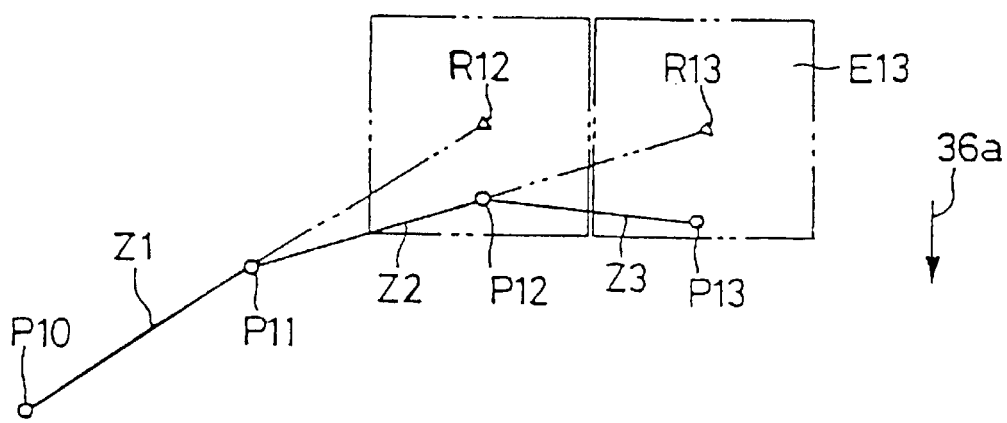
FIG. 11 is a diagram showing input points P10, P11, P12 and P13 continuously inputted when a curve having a large curvature is drawn, and prediction points R12 and R13 of the input points P12 and P13.

FIG. 11 is a diagram showing input points P10, P11, P12 and P13 continuously inputted when a curve having a large curvature is drawn and prediction points R12 and R13 of the input points P12 and P13. A line segment Z1 has both ends of the input points P10 and P11. A line segment Z2 has both ends of the input points P11 and P12. A line segment Z3 has both ends of the input points P12 and P13. At this time, a curve in which an angle between the segments Z1 and Z2 and an angle between the segments Z2 and Z3 are greater than 180 degrees as shown in Figure and the segments Z1 through Z3 are connected sequentially curves in the direction indicated by an arrow 36a. At this time, the segments Z2 and Z3 separate considerably from line segments represented by two-dot chain lines having both ends of the input points P11 and P12, the origins thereof, and predicted points R12 and R13. The segments Z2 and Z3 are also shorter than the segment Z1. Accordingly, the displacement of the coordinate of the input points P12 and P13 is smaller than that of the input point P11.

At this time, a predicted coordinate area E13 of the input point P13 extends also in the direction closer to the input point P12 which is the past input point rather than the predicted point R13. Accordingly, the input point P13 is contained within the predicted coordinate area E13 even if the displacement of the coordinate from the input point P12 to the input point P13 is smaller than the displacement of the coordinate from the input point P11 to the input point P12.

Further, when a curve is to be drawn, speed of moving a pen drops by that degree in general, so that the displacement of the coordinate becomes less. Accordingly, because the predicted area E13 becomes closer to the input point P12, the origin, the input point is readily included in the area even if the displacement decreases.

It is possible to discriminate whether a coordinate of an input point is valid or not even when a curve having a large curvature is drawn by thus extending the predicted area E1 also at the side of downstream in the advance direction of the input points continuously inputted centering on the predicted coordinate provided at a position where the line segment connecting two past coordinates is extended.

Figure 13:
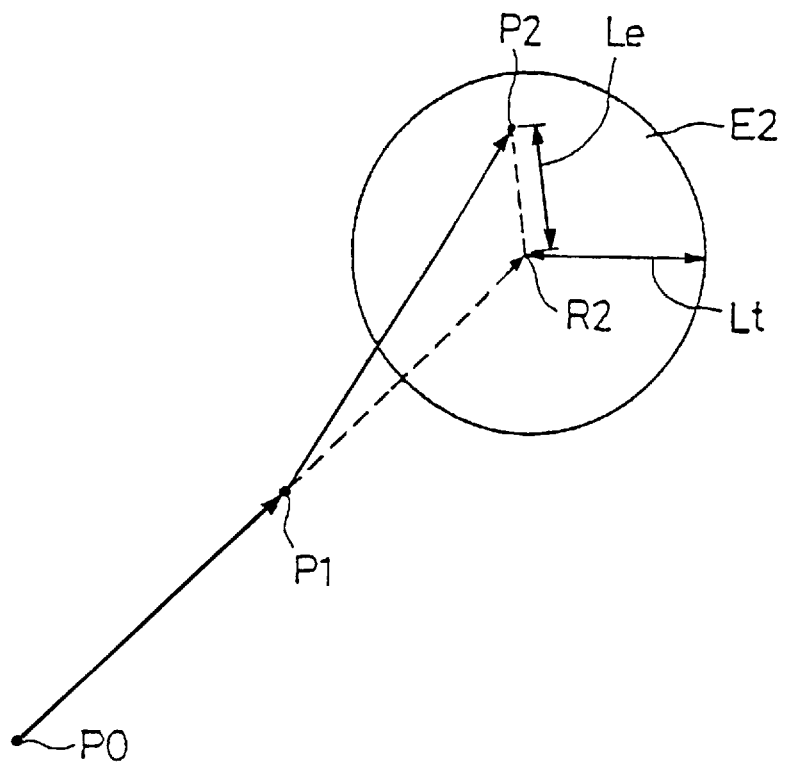
FIG. 13 is a diagram showing a relationship of positions of a latest input point P1, a past input point P0, a future input point P2 and a prediction point R2 of the input point P2 when the future input point P2 is valid, and a predicted coordinate area E2 in the coordinate input apparatus of the second embodiment.

A coordinate input apparatus of a second embodiment of the present invention will be explained below. The coordinate input apparatus of the present embodiment has the similar structure with the coordinate input apparatus 21 of the first embodiment except details of the structure of the erroneous input discriminating circuit and the behavior thereof, the same components of the coordinate input apparatuses are designated by the same reference numerals and the detailed explanation thereof will be omitted here. In the coordinate input apparatus 21 of the present embodiment, a predicted area E2 is a circular area which is centered on the predicted point R2 and whose radius is a predetermined length Lt. FIG. 13 shows this predicted area E2.

The behavior of the tablet control circuit of the coordinate input apparatus will be briefly described. The tablet control circuit obtains coordinate of a latest input point P1 from the tablet 24 per predetermined period T. The coordinate predicting circuit 43 finds a predicted point R2 of a future input point P2 based on the coordinates of the past and latest input points P0 and P1. An erroneous input discriminating circuit 81 performs an erroneous input discriminating operation described later based on the predicted point R1 found during the previous sampling operation. Coordinate of an output point Q1 is determined by implementing a first definition step based on the error status signal Se1 from the circuit 81 in the multipliers 45a and 45b and a second definition step based on the pen-down status signal Sd(-1) during the operation of two times before in the multipliers 46a and 46b for the coordinate of the latest input point P1. The processing circuit 27 causes the display unit 28 to display the output point only when the coordinate is valid coordinate based on the coordinate of the output point Q1 and the signals Sd(-1) and Se1. The coordinate predicting step, the first and second definition steps and the processing in the processing circuit 27 are equal to each step of the coordinate input apparatus 21 in the first embodiment.

Figure 12:
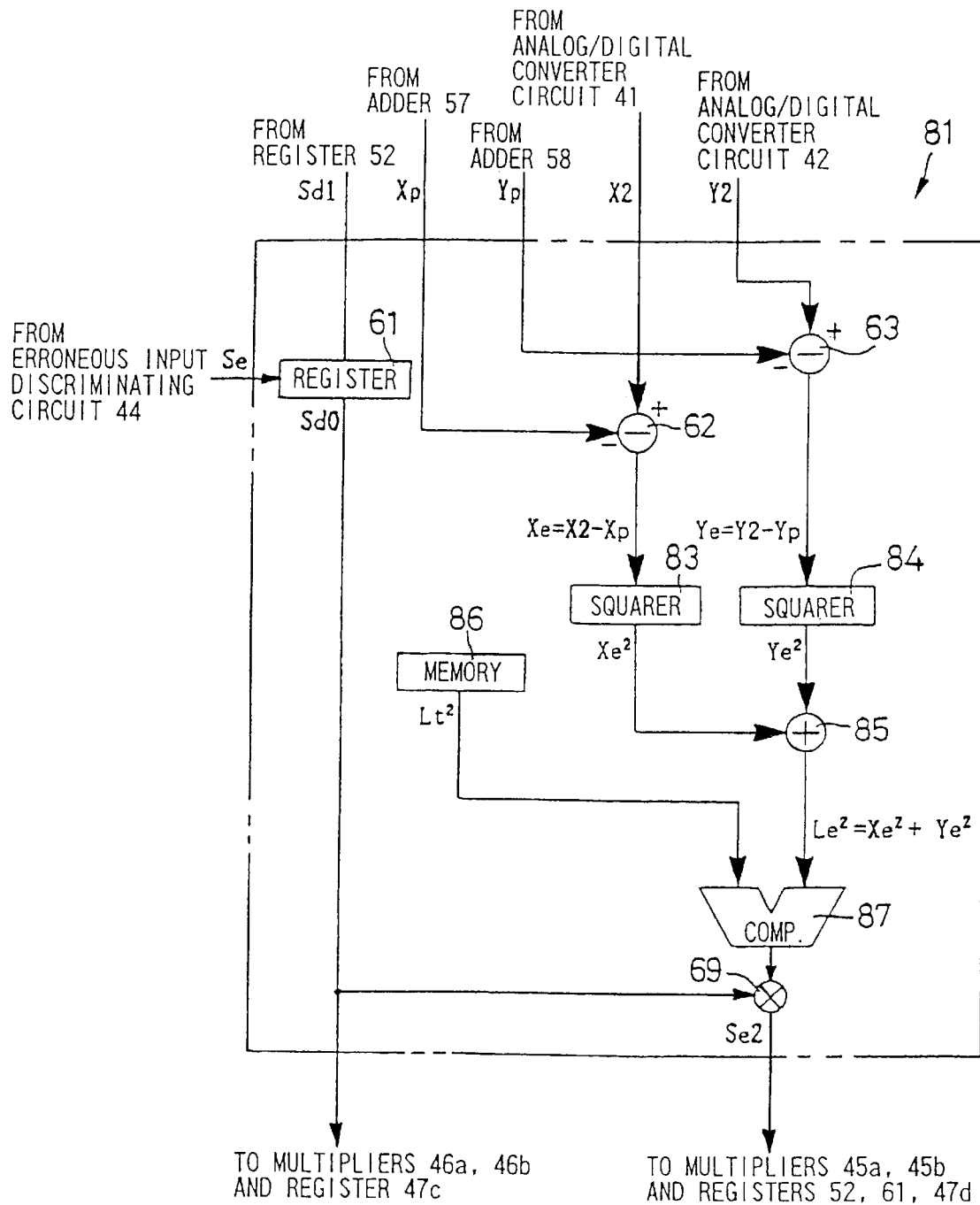
FIG. 12 is a block diagram showing a concrete structure of an erroneous input discriminating circuit 81 of the coordinate input apparatus according to a second embodiment of the present invention.
Figure 14:
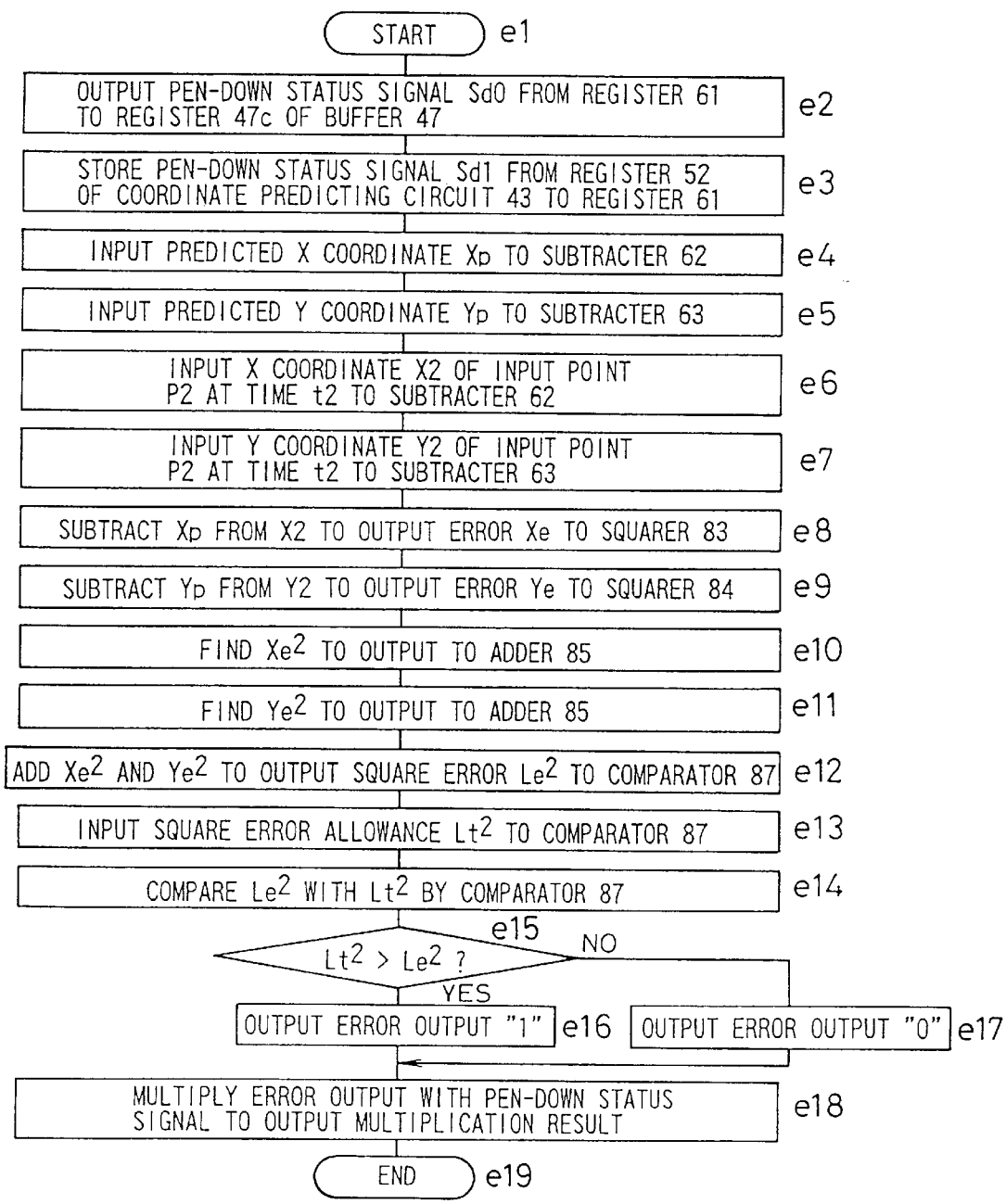
FIG. 14 is a flowchart for explaining an erroneous input discriminating operation in the erroneous input discriminating circuit 81.

FIG. 12 is a block diagram showing a concrete structure of the erroneous input discriminating circuit 81 of the coordinate input apparatus described above. FIG. 14 is a flowchart for explaining the erroneous input discriminating operation in the erroneous input discriminating circuit 81. The erroneous input discriminating circuit 81 has the similar structure with the erroneous input discriminating circuit 44 in the first embodiment, so that the same components are designated with the same reference numerals and a detailed explanation thereof will be omitted here. The flowchart also has the similar structure with the flowchart in FIG. 9. The explanation will be made with reference to both FIGS. 12 and 14.

The erroneous input discriminating circuit 81 comprises the register 61, the subtracters 62 and 63, squarers 83 and 84, an adder 85, a memory 86 and a comparator 87. The following operation is assumed to be performed at time t2 for example. At this time, the sampling circuit 40 samples and obtains values of coordinate (X2, Y2) of the input point P2 at time t2. The predicted point R2 of the input point P2 is found during the input discriminating operation at time t1 going back from time t2 by one period T.

The erroneous input discriminating circuit 81 is activated when the activation output of the timer 48 is output at time t2. When the circuit 81 is activated, the process advances from Step e1 to Step e2. At Step e2, the pen-down status signal Sd0 stored in the register 61 is output to be given to the multipliers 46a and 46b as well as the register 47c. The signal Sd0 is used in the second discrimination process and in the process of the processing circuit 27. The signal Sd0 is given also to the multiplier 69 of the circuit 81. After outputting the signal Sd0, the process advances to Step e3. At Step e3, the pen-down status signal Sd1 at time t1 output from the register 52 of the coordinate predicting circuit 43 is stored to the register 61. After storing the signal Sd1, the process advances to Step e4. Due to this operation, the pen-down status signal Sd given to the circuit 81 is output from the circuit 81 by being delayed by one period of time T.

At Step e4, the predicted X coordinate Xp output from the adder 57 of the coordinate predicting circuit 43 is inputted to the subtracter 62. Then, the process advances to Step e5. At Step e5, the predicted Y coordinate Yp output from the adder 58 of the coordinate predicting circuit 43 is inputted to the subtracter 63. Then, the process advances to Step e6. At Step e6, the X coordinate X2 of the future input point P2 is inputted from the analog/digital converter circuit 41 of the sampling circuit 40 to the subtracter 62. Then, the process advances to Step e7. At Step e7, the X coordinate X2 of the future input point P2 is inputted from the analog/digital converter circuit 42 of the circuit 40 to the subtracter 63. Then, the process advances to Step e8.

At Step e8, the predicted X coordinate Xp is subtracted from the X coordinate X2 of the future input point P2 to obtain an error Xe of the X coordinate in the substrater 62:

$$Xe=X2-Xp \tag{11}$$

The error Xe thus obtained is given to the squarer 83. After obtaining the error Xe, the process advances to Step e9. At Step e9, the value of the predicted Y coordinate Yp is subtracted from the value of the Y coordinate Y2 of the future input point P2 to obtain an error Ye of the Y coordinate in the substrater 63:

$$Ye = Y2 - Yp \quad (12)$$

The error Ye thus obtained is given to the squarer 84. After obtaining the error Ye, the process advances to Step e10.

At Step e10, a square value $Xe^2$ of the error Xe of the X coordinate is obtained by the squarer 83 and is inputted to the adder 85. Then, the process advances to Step e11. At Step e11, a square value $Ye^2$ of the error Ye of the Y coordinate is obtained by the squarer 84 and is inputted to the adder 85. Then, the process advances to Step e12. At Step e12, the square values $Xe^2$ and $Ye^2$ of the X coordinate and the Y coordinate are added to obtain a square error $Le^2$ in the adder 85. The square error $Le^2$ is a square value of a distance Le from the predicted point R2 to the future input point P2.

$$Le^2 = Xe^2 + Ye^2 \quad (13)$$

The square error $Le^2$ is supplied to the comparator 87. After obtaining the square error $Le^2$, the process advances to Step e13. At Step e13, a square error allowance $Lt^2$ is read from the memory 86 to input to the comparator 87. Then, the process advances to Step e14. At Step e14, the square error $Le^2$ is compared with the square error allowance $Lt^2$ in the comparator 87. Then, the process advances to Step e15. The square error allowance $Lt^2$ is a square value of the predetermined length Lt, i.e. the radius of the predicted area E2 described above. The relationship between the predetermined length Lt and the distance Le from the predicted point R2 to the future input point P2 is equal to the relationship between their square values.

At Step e15, it is determined whether the square error $Le^2$ is less than the square error allowance $Lt^2$. When it is the case, the future input point P2 is contained within the predicted area E2 as shown in FIG. 13. Accordingly, when the square error $Le^2$ is determined to be less than the square error allowance $Lt^2$, the process advances to Step e16. At Step e16, the comparator 87 outputs the error output "1" to the multiplier 69. Then, the process advances to Step e18.

$$1: Lt^2 > Le^2 \quad (14)$$

Figure 15:
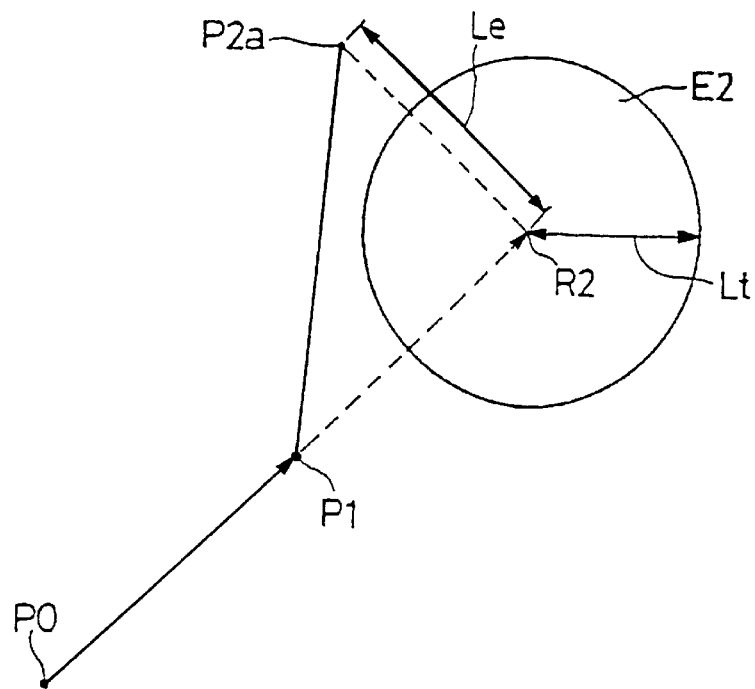
FIG. 15 is a diagram showing a relationship of positions of the latest input point P1, the past input point P0, the future input point P2 and the prediction point R2 of the input point P2 when the future input point P2 is invalid, and the predicted coordinate area E2 in the coordinate input apparatus of the second embodiment.

When the value of the square error $Le^2$ is the value of the square error allowance $Lt^2$ or more, the future input point P2 is determined to be located out of the range of the predicted area E2 as shown in FIG. 15. At this time, the process advances from Step e15 to Step e17 to output the error output "0" to the multiplier 69. Then the process advances to Step e18.

$$0: Lt^2 < Le^2 \quad (15)$$

At Step e18, the error output is multiplied with the pen-down status signal Sd0 at time t0 in the multiplier 69. This multiplication result is output as an error status signal Se2 at time t2. The signal Se2 turns out to be "1" only when the value of the error output and the signal Sd0 are both "1". The value of the signal Se2 turns out to be "0" when either of the value of the multiplication result or the signal Sd0 is "0". When the error status signal Se2 is output, the process advances to Step e19, thus ending the operation of the process in the flowchart.

The error status signal Se2 is supplied to the multipliers 45a and 45b of the tablet control circuit 25 and the register 47d of the buffer 47 described above, respectively, to be used for the first definition process and the process in the processing circuit 27. The error status signal Se2 is also supplied to the registers 52 and 61 of the circuits 43 and 44 to reset those registers 52 and 61 when the input point P2 is an erroneous input.

Because the predicted range E2 is a circular area as described above, only one time of operation for comparing the error and the error allowance is required. Accordingly, the discrimination of erroneous input in the erroneous input discriminating circuit 81 may be readily performed.

A coordinate input apparatus of a third embodiment of the present invention will be explained below. The coordinate input apparatus of the present embodiment has the similar structure with the coordinate input apparatus 21 of the first embodiment except details of the structure of the erroneous input discriminating circuit and the behavior thereof, the same components of the coordinate input apparatuses are designated by the same reference numerals and the detailed explanation thereof will be omitted here. In the coordinate input apparatus of the present embodiment, a predicted area E3 is a sector area containing the predicted point R2 therein.

The behavior of the tablet control circuit of the coordinate input apparatus will be briefly described. The tablet control circuit obtains coordinate of a latest input point P1 from the tablet 24 per predetermined period T. The coordinate predicting circuit 43 finds a predicted point R2 of a future input point P2 based on the coordinates of the past and latest input points P0 and P1. The erroneous input discriminating circuit performs an erroneous input discriminating operation described later based on the predicted point R1 found during the previous sampling operation (at time t0). Coordinate of an output point Q1 is determined by implementing a first definition step based on the error status signal Se1 from the circuit in the multipliers 45a and 45b and a second definition step based on the pen-down status signal Sd(−1) during the operation of two times before (at time t(−1)) in the multipliers 46a and 46b for the coordinate of the latest input point P1. The processing circuit 27 causes the display unit 28 to display the output point only when the coordinate is valid coordinate based on the coordinate of the output point Q1 and the signals Sd(−1) and Se1. The coordinate predicting step, the first and second definition steps and the processing in the processing circuit are equal to each step of the coordinate input apparatus 21 in the first embodiment.

Figure 16:
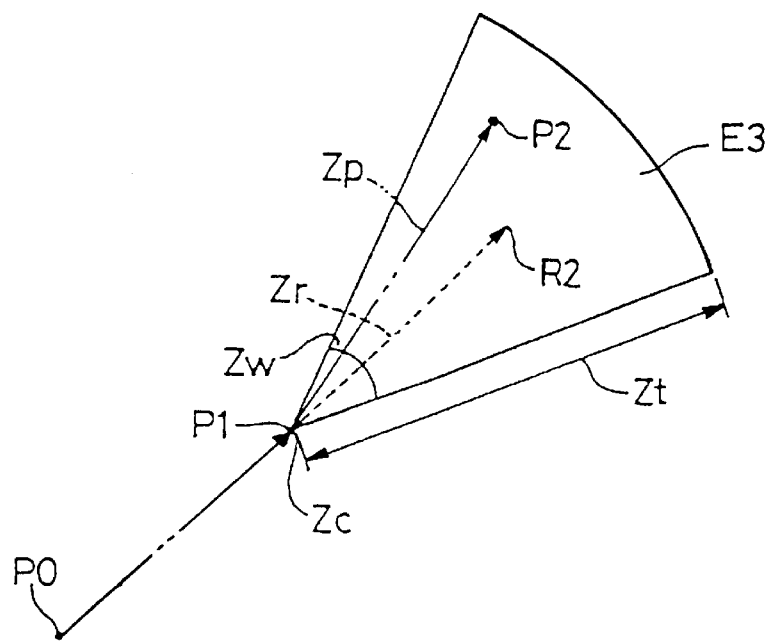
FIG. 16 is a diagram showing a relationship of positions of a latest input point P1, a past input point P0, a future input point P2 and a prediction point R2 of the input point P2 when the future input point P2 is valid and a predicted coordinate area E3 in the coordinate input apparatus of a third embodiment of the present invention.
Figure 17:
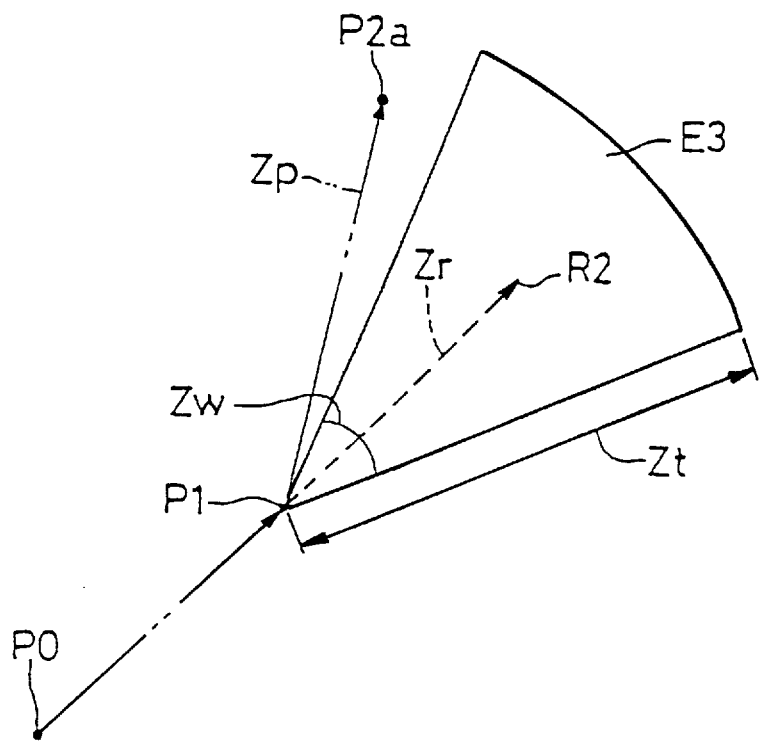
FIG. 17 is a diagram showing a relationship of positions of the latest input point P1, the past input point P0, the future input point P2 and the prediction point R2 of the input point P2 when the future input point P2 is invalid, and the predicted coordinate area E3 in the coordinate input apparatus of the third embodiment.
Figure 18:
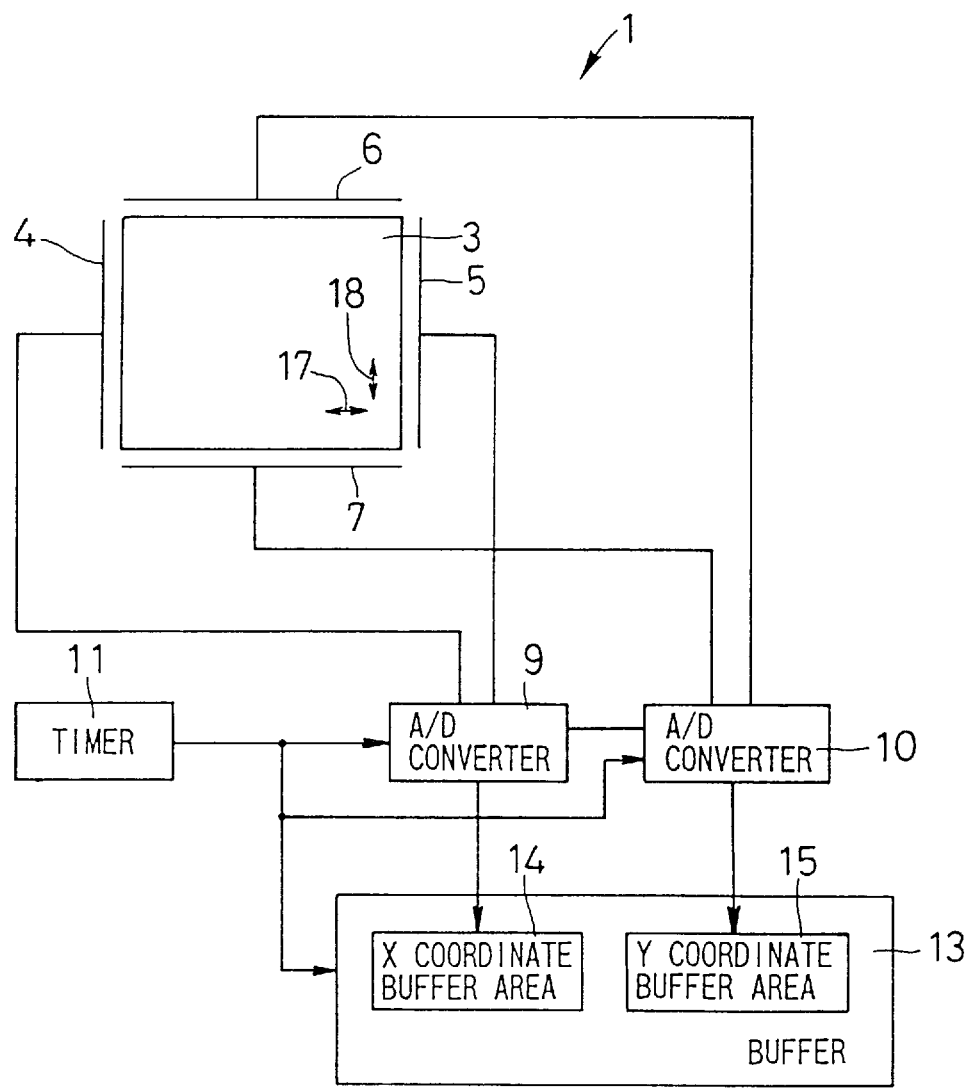
FIG. 18 is a block diagram showing a structure of an electronic equipment comprising a prior art coordinate input apparatus.

FIG. 16 is a diagram showing a predicted coordinate area E3 in the erroneous input discriminating circuit of the coordinate input apparatus described above. The predicted coordinate area E3 is a sector area in which the predicted point R2 is contained, a length of the radius is an allowable error Zt and a degree of the a central angle is a predicted error angle Zw. The center Zc of an imaginary circle containing the sector arc of the predicted coordinate area E3 and the length of the radius is the allowable error Zt is located on a position on a line segment Zr having both ends of the latest input point P1 and the predicted point R2 separated from the predicted point R2 by a predetermined distance. This distance does not exceed the allowable error Zt which is the length of the radius of the imaginary circle and is equal to the length of the segment Zr for example. The straight line containing the segment Zr is a bisector of the allowable error angle Zw which is the central angle of the predicted coordinate area E3 for example. Therefore, the predicted point R2 is located on the straight line passing through the allowable error angle Zw and coincides with a point within the predicted coordinate area E3 separated from the center Zc of the imaginary circle by the predetermined distance.

The erroneous input discriminating circuit sets the sector predicted coordinate area E3 based on the latest input point P1 and the predicted point R2. The erroneous input discriminating circuit determines whether the input point P2 is contained within the predicted coordinate area E3 on the basis of the length of the segment Zp having the both ends of the center Zc of the imaginary circle and the input point P2 and the angle formed between the segment Zp and the segment Zt. The input point P2 is considered to be contained within the predicted coordinate area E3 only when the length of the segment Zp is less than the allowable error Zt and the angle formed between the segment Zp and the segment Zr is less than the half of the allowable error angle Zw.

When the future input point P2 (X2, Y2) is contained within the input area E3, the input discriminating circuit determines that the value of the coordinate of the input point P2 is valid and outputs the error status signal Se whose value is "1". The input point P2 in FIG. 16 shows the state when the coordinate is valid coordinate. When the future input point P2 is not contained within the input area E3, the circuit determines that the value of coordinate of the input point P2 is invalid and outputs the error status signal Se whose value is "0". The values of coordinate X2 and Y2 of the input point P2 are defined or rejected in the first definition step in the multipliers 45a and 45b based on the error status signal Se.

When a plurality of input points are inputted continuously from the tablet 24, the user is drawing a curve on the pointing area 31 of the tablet 24. Accordingly, a point which can be inputted at time t2 is considered to be in the vicinity of an extension line of the line segment having the input points P0 and P1 near the input point P1. When the speed for drawing the curve increases and an input point separates from the input point P1 along the direction parallel with the extension line, a range where the input point may exist is considered to extend in the direction crossing at right angles with the extension line. The extension line of the segment contains the segment Zr having the both ends of the latest input point P1 and the predicted point R2.

The further in the direction of drawing the curve from the latest input point within the pointing area 31, the wider the sector predicted coordinate area E3 becomes. Therefore, the farther from the latest input point P1, the more a number of points which can be valid coordinate increases in the direction crossing at right angles with the segment Zr from the predicted point R2. Accordingly, points which can be inputted when the user draws a curve by inputting points of coordinate may be contained more. Thereby, the input points which are inputted continuously by drawing the curve may be considered as valid coordinates without mistake.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A coordinate input apparatus comprising:

two-dimensional coordinate input means having a flat pointing area, for outputting a two-dimensional coordinate corresponding to a point within the pointing area which is continuously pointed, per a predetermined period;

coordinate predicting means for defming a predicted coordinated area showing a range of coordinates predicted to be outputted from the two-dimensional coordinate input means in correspondence to the coordinate outputted from the two-dimensional coordinate input means, in accordance to a predetermined procedure per a predetermined period;

erroneous input discriminating means for determining that the coordinate outputted from the two-dimensional coordinate input means is valid only when the coordinate is contained within the predicted coordinate area defined in correspondence to the coordinate; and coordinate defining means for defining the coordinate outputted from the two-dimensional coordinate input means as it is when the coordinate is determined to be valid by erroneous input discriminating means and for the rejecting the coordinate when it is determined to be invalid; wherein the coordinate predicting means corresponds to the output of the coordinate defining means and defines the predicted coordinate area by using a plurality of coordinates defined by the coordinate defining means.

2. The coordinate input apparatus of claim 1, wherein the coordinate predicting means comprises;

displacement computing means for determining a displacement of a coordinate to a past coordinate defined from the latest coordinate defined by the coordinate defining means and a displacement direction; and predicted coordinate computing means for determining a predicted coordinate which is displaced from the latest coordinate defined by the coordinate defining means by the displacement determined by the displacement computing means in the displacement direction;

wherein an area having the predetermined size containing the predicted coordinate is defined as the predicted coordinate area.

3. The coordinate input apparatus of claim 2, wherein two coordinate axes which cross each other are defined in the pointing area, and coordinates are represented by values of a corresponding point on the respective coordinate axes and that the predicted coordinate area, each side of the predicted coordinate area being parallel with either of the coordinate axes and having a predetermined length, and the area is centered on the predicted coordinate.

4. The coordinate input apparatus of claim 2, wherein the predicted coordinate area is a circular area which is centered on the predicted coordinate, having a radius of a predetermined length.

5. The coordinate input apparatus of claim 2, wherein the predicted coordinate area is a sector area having a radius of a predetermined length and a central angle of a predetermined degree, and a line segment having both ends of the defined latest coordinate and the predicted coordinate, passes through the center of an imaginary circle containing an arc of the sector area.

6. The coordinate input apparatus of claim 2, wherein the erroneous input discriminating means comprises;

error detecting means for determining an error which is a distance between a point represented by the coordinate outputted from the two-dimensional coordinate input means and a point represented by the predicted coordinate determined by the predicted coordinate computing means, corresponding to the coordinate; and discriminating means for determining that the latest coordinate is valid when the error determined by the error detecting means is less than a predetermined distance between the end of the predicted coordinate area and a point represented by the predicted coordinate in the direction heading to a point represented by the coordinate outputted from the point represented by the predicted coordinate and for determining that the latest coordinate is invalid when the error is the predetermined distance or more.

7. The coordinate input apparatus of claim 1, wherein the two-dimensional coordinate input means outputs a status signal indicative that the coordinate has been outputted every time of outputting a two-dimensional coordinate, the coordinate input apparatus further comprising a delay circuit for delaying the status signal by a predetermined delay time necessary for outputting coordinates of a predetermined number of points used in defining the predicted coordinate area from the two-dimensional coordinate input means and for outputting the status signal to the coordinate defining means, wherein the coordinate defining means defines the coordinate only when the status signal is supplied.

8. The coordinate input apparatus of claim 7, wherein the erroneous input discriminating means determines whether the coordinate is valid or not only when the status signal outputted from the delay circuit is supplied, the delay circuit being constructed so that the output from the erroneous input discriminating means is supplied thereto, the same number of memory elements with the predetermined number are connected sequentially so that the outputs thereof are transferred to the next memory elements and the outputs of the previous memory elements are supplied per predetermined period, and each memory element stores each status signal individually and erases its memory content when the coordinate is determined to be invalid by the erroneous input discriminating means.

* * * * *